United States Patent
Kato

(10) Patent No.: US 10,939,024 B2
(45) Date of Patent: Mar. 2, 2021

(54) IMAGE PROCESSING SYSTEM, IMAGE PROCESSING DEVICE AND IMAGE PROCESSING PROGRAM FOR IMAGE MEASUREMENT

(71) Applicant: OMRON Corporation, Kyoto (JP)

(72) Inventor: Yutaka Kato, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/275,334

(22) Filed: Feb. 14, 2019

(65) Prior Publication Data

US 2019/0289178 A1    Sep. 19, 2019

(30) Foreign Application Priority Data

Mar. 15, 2018  (JP) .............................. JP2018-047629

(51) Int. Cl.
*H04N 5/225*    (2006.01)
*G01N 21/55*    (2014.01)
(Continued)

(52) U.S. Cl.
CPC ........... *H04N 5/2256* (2013.01); *G01N 21/55* (2013.01); *G01N 21/8851* (2013.01);
(Continued)

(58) Field of Classification Search
CPC ........... G01N 21/8806; G01N 21/8851; G01N 21/55; G06T 7/001; G06T 2207/10152;
(Continued)

(56) References Cited

U.S. PATENT DOCUMENTS 4,873,651 A * 10/1989 Raviv ................... G06T 1/0014
                                                                700/259
5,986,763 A * 11/1999 Inoue ................. G01B 11/0608
                                                                348/126
(Continued)

FOREIGN PATENT DOCUMENTS

JP       2017223458         12/2017
WO    WO-2018177655 A1 * 10/2018 ............. G01N 21/93

OTHER PUBLICATIONS

"Search Report of Europe Counterpart Application", dated Apr. 25, 2019, p. 1-p. 9.
(Continued)

*Primary Examiner* — David E Harvey
(74) *Attorney, Agent, or Firm* — JCIPRNET

(57) ABSTRACT

An image processing system, an image processing device and an image processing method that can improve performance of an image measurement are provided. A control device controls a light emission portion in a manner that each of plural types of partial regions set on a light emission surface emits light, and controls a camera to image an object in synchronization with light emission of each of the plural types of partial regions. The control device performs an image measurement of the object based on reflection profile information which is generated based on a plurality of input images, and the reflection profile information shows a relationship between positions within the light emission surface and degrees of light reflected at attention sites of the object and incident to the camera with respect to light irradiated from the position to the object.

13 Claims, 20 Drawing Sheets

(51) Int. Cl.
*G01N 21/88* (2006.01)
*G06K 9/62* (2006.01)
*G06T 7/00* (2017.01)
*H04N 5/232* (2006.01)

(52) U.S. Cl.
CPC ............ *G06K 9/6215* (2013.01); *G06T 7/001* (2013.01); *H04N 5/232* (2013.01); *G06T 2207/10016* (2013.01); *G06T 2207/10152* (2013.01); *G06T 2207/30164* (2013.01)

(58) Field of Classification Search
CPC ..... G06T 7/0004; G06T 7/586; H04N 5/2256; H04N 5/232
See application file for complete search history.

(56) References Cited

U.S. PATENT DOCUMENTS

| | | | | |
|---|---|---|---|---|
| 6,542,238 | B1* | 4/2003 | Tsuboi | H05K 13/0812 356/401 |
| 6,788,411 | B1* | 9/2004 | Lebens | G01N 21/21 356/364 |
| 9,494,528 | B2* | 11/2016 | Matsuda | G01N 21/8806 |
| 10,139,350 | B2* | 11/2018 | Sun | H04N 13/254 |
| 2002/0009218 | A1* | 1/2002 | Chapman | G01N 21/88 382/141 |
| 2004/0184031 | A1* | 9/2004 | Vook | G06T 7/0002 356/237.1 |
| 2004/0184032 | A1* | 9/2004 | Mahon | G01N 21/95684 356/237.3 |
| 2006/0109345 | A1* | 5/2006 | Stenger | G01R 31/309 348/92 |
| 2007/0176927 | A1* | 8/2007 | Kato | G06T 7/586 345/426 |
| 2008/0024765 | A1* | 1/2008 | Oka | G01N 21/9501 356/73 |
| 2008/0062424 | A1* | 3/2008 | Shires | F21K 9/68 356/446 |
| 2011/0222286 | A1* | 9/2011 | Oba | G03B 15/05 362/249.04 |
| 2014/0354984 | A1* | 12/2014 | Tung | G01N 21/4738 356/237.5 |
| 2014/0372075 | A1* | 12/2014 | Kojima | G01B 11/00 702/167 |
| 2015/0355101 | A1* | 12/2015 | Sun | H04N 13/254 348/46 |
| 2015/0358602 | A1* | 12/2015 | Mayumi | G01N 21/8851 348/46 |
| 2017/0019578 | A1* | 1/2017 | Wang | H04N 5/2256 |
| 2017/0069075 | A1* | 3/2017 | Okuda | G06T 11/60 |
| 2017/0089840 | A1* | 3/2017 | Hashiguchi | G01N 21/8806 |
| 2017/0089841 | A1* | 3/2017 | Uemura | G01N 21/8806 |
| 2017/0186148 | A1* | 6/2017 | Uemura | G06T 7/0004 |
| 2017/0315062 | A1* | 11/2017 | Matsuda | G01N 21/8806 |
| 2018/0068433 | A1* | 3/2018 | Imakoga | G06T 7/0006 |

OTHER PUBLICATIONS

Robin Gruna, et al., "Acquisition and Evaluation of Illumination Series for Unsupervised Defect Detection," 2011 IEEE International Instrumentation and Measurement Technology Conference, May 2011, pp. 1-6.

* cited by examiner

IMAGE PROCESSING SYSTEM, IMAGE PROCESSING DEVICE AND IMAGE PROCESSING PROGRAM FOR IMAGE MEASUREMENT

CROSS-REFERENCE TO RELATED APPLICATION

This application claims the priority of Japan patent application serial no. 2018-047629, filed on Mar. 15, 2018. The entirety of the above-mentioned patent application is hereby incorporated by reference herein and made a part of this specification.

BACKGROUND

Technical Field

The disclosure relates to an image processing system, an image processing device and an image processing program.

Related Art

In an FA (Factory Automation) field and the like, an image processing technique is used in which an object is imaged under illumination by light from an illumination device and information about a work-piece is obtained from image data that is generated.

In the image processing technology field, illumination conditions while an appearance inspection of an object is performed greatly affect precision of the appearance inspection. For example, in Japanese Laid-open No. 2017-223458 (patent document 1), an image processing sensor is disclosed which selects one brightness condition in accordance with selection conditions from a plurality of brightness condition candidates.

RELATED ART DOCUMENT(S)

Patent Document(s)

(Patent Document 1) Japanese Laid-open No. 2017-223458

An image processing sensor which is one type of the image processing device disclosed in patent literature 1 uses an image captured under one brightness condition to perform an image measurement. However, because the image processing device disclosed in patent literature 1 uses the image captured under one brightness condition to perform the image measurement, there is a case that a surface state of the object does not appear on the image under one brightness condition that is set depending on the surface state of the object such as a shape and the like of scratches formed on the surface of the object.

That is, in a case that the images are captured under one brightness condition, there is a limit of improving performance of the image measurement.

SUMMARY

According to one example of the disclosure, an image processing system performing an image measurement is provided. The image processing system includes: an imaging portion, which images an object; a light emission portion, which has a light emission surface directed toward the object; a light emission control portion, which controls the light emission portion in a manner that each of plural types of partial regions set in advance in the light emission surface emits light; an imaging control portion, which controls the imaging portion to image in synchronization with light emission of each of the plural types of partial regions; a generation portion, which generates reflection profile information, wherein the reflection profile information is obtained based on a plurality of images which are captured by the imaging portion in synchronization with the light emission of each of the plural types of partial regions, and the reflection profile information shows relationships between positions within the light emission surface and degrees of light reflected at attention sites of the object and incident to the imaging portion with respect to the light irradiated to the object from the positions; and an image measurement portion, which performs the image measurement of the object based on the reflection profile information generated by the generation portion.

According to another example of the disclosure, an image processing device which controls an imaging portion imaging an object and a light emission portion having a light emission surface directed toward the object to perform an image measurement is provided. The image processing device includes: a light emission control portion, which controls the light emission portion in a manner that each of plural types of partial regions set in advance in the light emission surface emits light; an imaging control portion, which controls the imaging portion to image in synchronization with each of the light emission of the plural types of partial regions; a generation portion, which generates reflection profile information, wherein the reflection profile information is obtained based on a plurality of images which are captured by the imaging portion in synchronization with the light emission of each of the plural types of partial regions, and the reflection profile information shows relationships between positions within the light emission surface and degrees of light reflected at attention sites of the object and incident to the imaging portion with respect to the light irradiated to the object from the positions; and an image measurement portion, which performs the image measurement of the object based on the reflection profile information generated by the generation portion.

According to another example of the disclosure, an image processing program which is executed in an image processing device is provided, and the image processing device controls an imaging portion imaging an object and a light emission portion having a light emission surface directed toward the object to perform an image measurement. The image processing program includes: a step in which the light emission portion is controlled in a manner that each of plural types of partial regions set in advance in the light emission surface emits light; a step in which the imaging portion is controlled to image in synchronization with light emission of each of the plural types of partial regions; a step in which reflection profile information is generated, wherein the reflection profile information is obtained based on a plurality of images which are captured by the imaging portion in synchronization with the light emission of each of the plural types of partial regions, and the reflection profile information shows relationships between positions within the light emission surface and degrees of light reflected at attention sites of the object and incident to the imaging portion with respect to the light irradiated to the object from the positions; and a step in which the image measurement of the object is performed based on the reflection profile information generated by the generation portion.

DESCRIPTION OF THE EMBODIMENTS

Figure 1:
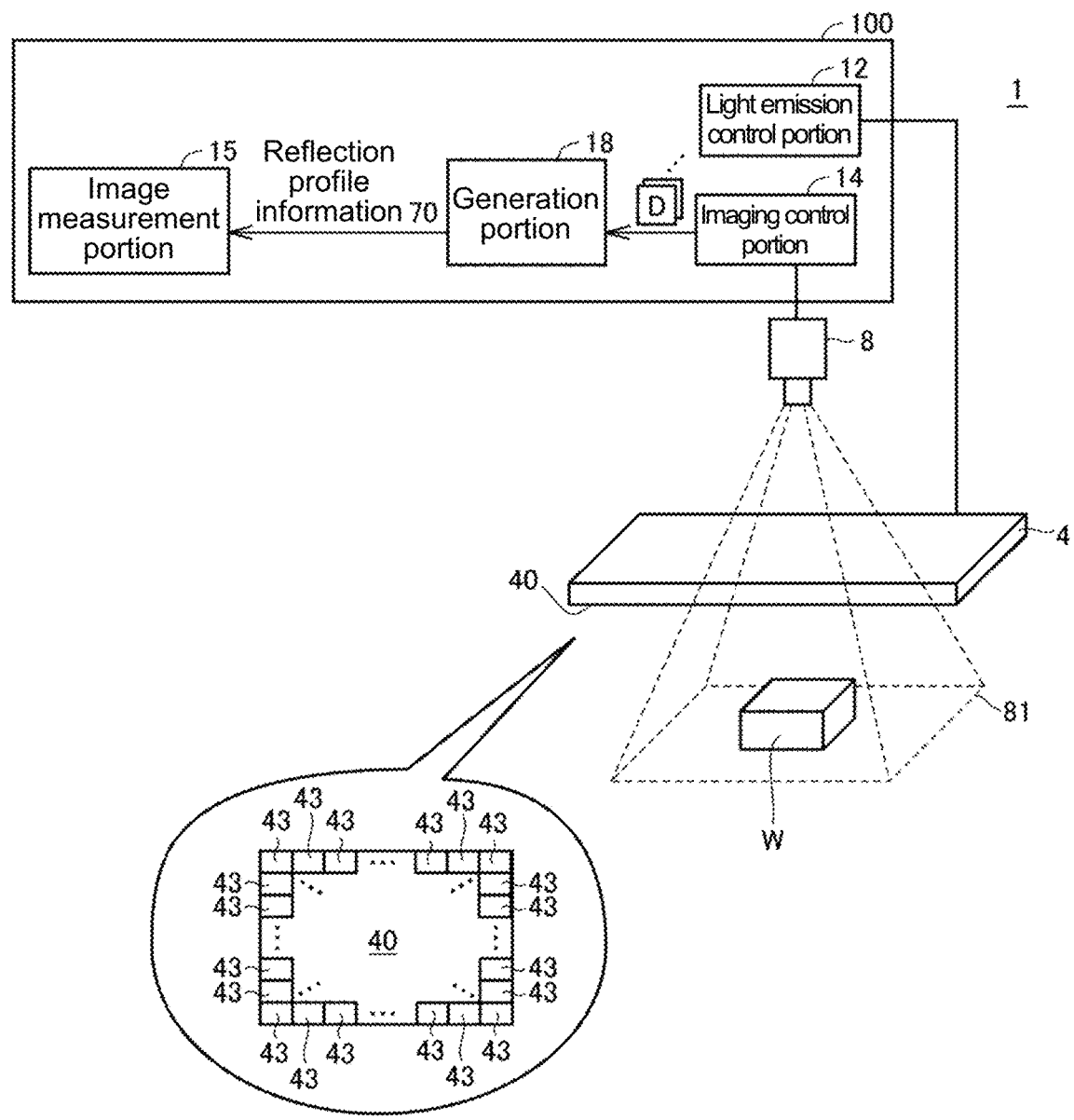
FIG. 1 is a drawing schematically showing an application scene of an image processing system of an embodiment.

The disclosure provides an image processing system, an image processing device and an image processing program that can improve performance of an image measurement as described above.

According to one example of the disclosure, an image processing system performing an image measurement is provided. The image processing system includes: an imaging portion, which images an object; a light emission portion, which has a light emission surface directed toward the object; a light emission control portion, which controls the light emission portion in a manner that each of plural types of partial regions set in advance in the light emission surface emits light; an imaging control portion, which controls the imaging portion to image in synchronization with light emission of each of the plural types of partial regions; a generation portion, which generates reflection profile information, wherein the reflection profile information is obtained based on a plurality of images which are captured by the imaging portion in synchronization with the light emission of each of the plural types of partial regions, and the reflection profile information shows relationships between positions within the light emission surface and degrees of light reflected at attention sites of the object and incident to the imaging portion with respect to the light irradiated to the object from the positions; and an image measurement portion, which performs the image measurement of the object based on the reflection profile information generated by the generation portion.

According to the disclosure, the degrees of the light reflected on the object and passes through a path to enter the imaging portion with respect to the light irradiated from the light emission surface are obtained independently for each position of the light emission surface that is irradiated, and the image measurement of the object is performed based on the information, and thus the image measurement based on a large amount of information can be performed. As a result, the performance of the image measurement can be improved.

In the above-described disclosure, the image measurement portion may further include: a calculation portion, which calculates a similarity between the reflection profile information generated from images obtained by imaging the object and reflection profile reference information set in advance; and a determination portion, which uses the similarity calculated by the calculation portion to judges an attribute of the object or the attention sites.

According to the disclosure, the attribute of the object or the attention sites can be judged.

In the above-described disclosure, the reflection profile reference information may be the reflection profile information generated from the images obtained by imaging the object having a known attribute or a specific site of the object.

According to the disclosure, the reflection profile reference information can be set by only preparing an object to which an attribute is to be measured and generating the reflection profile information thereof.

In the above-described disclosure, the reflection profile reference information may be information which statistically represents a plurality of reflection profile information generated for each of a plurality of sites which have mutually equal attributes.

According to the disclosure, the reflection profile reference information is not one information but the information based on a plurality of information, and thus the measurement precision can be improved.

In the above-described disclosure, the reflection profile information may be information which is obtained from each of the plurality of images and which is based on luminance information corresponding to attention points in an imaging visual field in the images and relative positions with respect to the attention points of the partial regions which emit light when the images are captured. The image processing system may further include an output portion which outputs the reflection profile information by a representation form in which the information corresponding to the luminance information is output to a coordinate system with two or more axes corresponding to the relative positions. The output portion may sequentially or simultaneously output the reflection profile reference information and the reflection profile information of the object to the coordinate system.

According to the disclosure, both the reflection profile information and the reflection profile reference information are output to the same coordinate system, and thus the two information can be compared on the same coordinate and the two information are easily compared.

In the above-described disclosure, the reflection profile reference information may include one or a plurality of first reflection profile reference information corresponding to a first attribute and one or a plurality of second reflection profile reference information corresponding to a second attribute. The determination portion may classify, based on the reflection profile information generated for each of a plurality of attention sites on the object, the attributes of the plurality of attention sites for each attention site.

According to the disclosure, it can be classified whether the attribute of each attention site is one of the plurality of attributes.

In the above-described disclosure, the image measurement portion may judge the attribute of each of the plurality of attention sites by extracting a feature amount of the reflection profile information generated for each of the plurality of attention sites on the object and evaluating the feature amount corresponding to each attention site.

According to the disclosure, the image measurement is performed by comparing the reflection profile information with one another which is generated for each of the plurality of attention sites on the object, and thus information which is used as a reference is unnecessary. As a result, operation of data input, registration and the like that are required to be performed by a designer as a preparation for performing the image measurement can be simplified.

According to another example of the disclosure, an image processing device which controls an imaging portion imaging an object and a light emission portion having a light emission surface directed toward the object to perform an image measurement is provided. The image processing device includes: a light emission control portion, which controls the light emission portion in a manner that each of plural types of partial regions set in advance in the light emission surface emits light; an imaging control portion, which controls the imaging portion to image in synchronization with each of the light emission of the plural types of partial regions; a generation portion, which generates reflection profile information, wherein the reflection profile information is obtained based on a plurality of images which are captured by the imaging portion in synchronization with the light emission of each of the plural types of partial regions, and the reflection profile information shows relationships between positions within the light emission surface and degrees of light reflected at attention sites of the object and incident to the imaging portion with respect to the light irradiated to the object from the positions; and an image measurement portion, which performs the image measurement of the object based on the reflection profile information generated by the generation portion.

According to the disclosure, the degrees of the light reflected on the object and passes through a path to enter the imaging portion with respect to the light irradiated from the light emission surface are obtained independently for each position of the light emission surface that is irradiated, and the image measurement of the object is performed based on the information, and thus the image measurement based on a large amount of information can be performed. As a result, the performance of the image measurement can be improved.

According to another example of the disclosure, an image processing program which is executed in an image processing device is provided, and the image processing device controls an imaging portion imaging an object and a light emission portion having a light emission surface directed toward the object to perform an image measurement. The image processing program includes: a step in which the light emission portion is controlled in a manner that each of plural types of partial regions set in advance in the light emission surface emits light; a step in which the imaging portion is controlled to image in synchronization with light emission of each of the plural types of partial regions; a step in which reflection profile information is generated, wherein the reflection profile information is obtained based on a plurality of images which are captured by the imaging portion in synchronization with the light emission of each of the plural types of partial regions, and the reflection profile information shows relationships between positions within the light emission surface and degrees of light reflected at attention sites of the object and incident to the imaging portion with respect to the light irradiated to the object from the positions; and a step in which the image measurement of the object is performed based on the reflection profile information generated by the generation portion.

According to the disclosure, the degrees of the light reflected on the object and passes through a path to enter the imaging portion with respect to the light irradiated from the light emission surface are obtained independently for each position of the light emission surface that is irradiated, and the image measurement of the object is performed based on the information, and thus the image measurement based on a large amount of information can be performed. As a result, the performance of the image measurement can be improved.

The image processing system, the image processing device and the image processing program that can improve the performance of the image measurement can be provided.

§ 1 APPLICATION EXAMPLE

Figure 2:
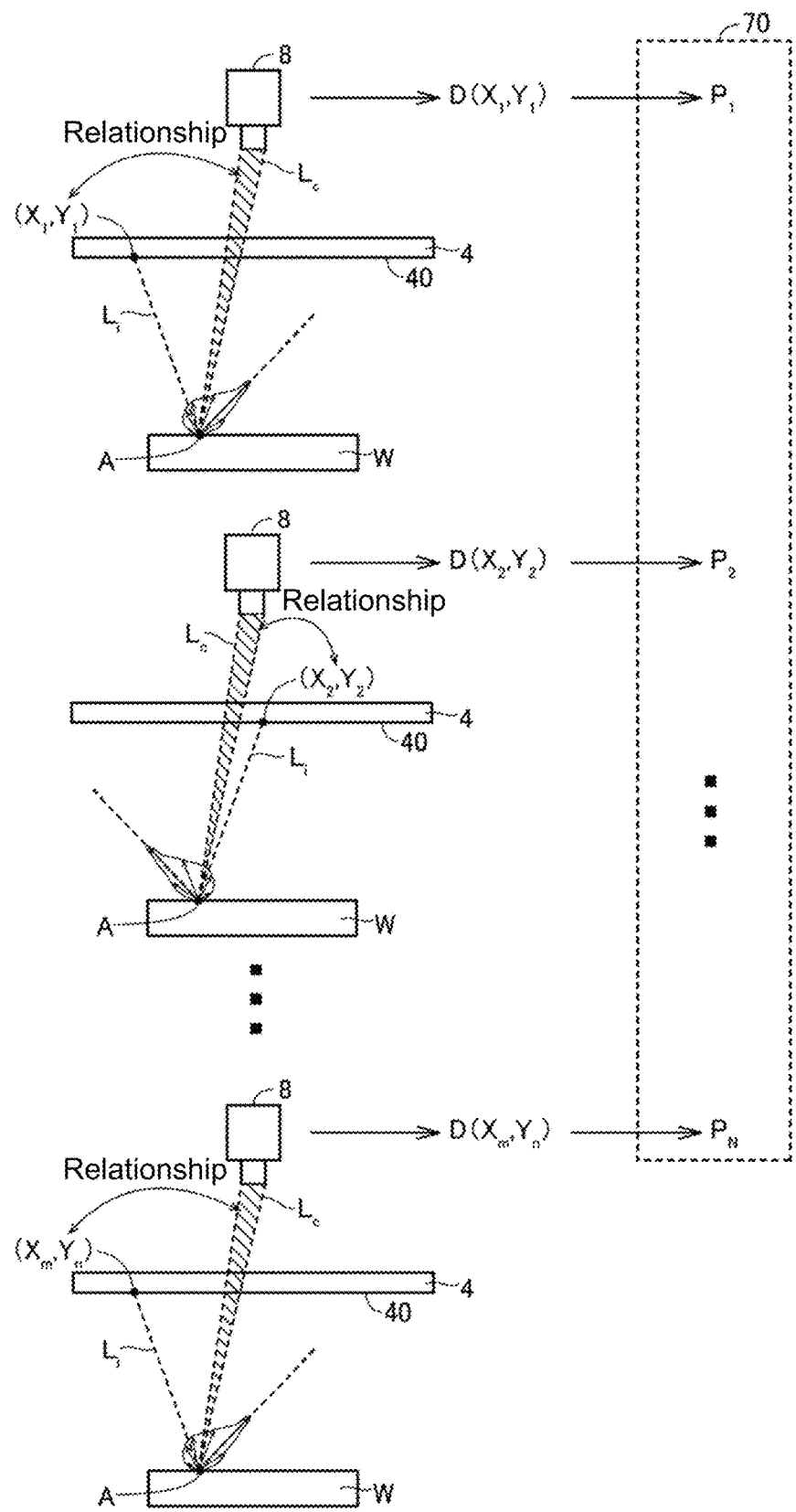
FIG. 2 is a drawing schematically showing reflection profile information.

At first, one example of a scene in which the disclosure is applied is described with reference to FIG. 1 and FIG. 2. FIG. 1 is a diagram schematically showing an application scene of an image processing system 1 of an embodiment. FIG. 2 is a diagram schematically showing reflection profile information 70.

The image processing system 1 of the embodiment includes a camera 8 which is one example of an imaging portion, an illumination device 4 which is one example of a light emission portion, and a control device 100 which controls processing executed in the image processing system 1. In addition, the control device 100 includes a light emission control portion 12 which controls the illumination device 4, an imaging control portion 14 which controls the camera 8, a generation portion 18 which generates reflection profile information, and an image measurement portion 15 which performs an image measurement based on the reflection profile information. As an example, the light emission control portion 12, the imaging control portion 14, the generation portion 18 and the image measurement portion 15 are arranged in the control device 100 which has a structure in accordance with general-purpose computer architecture.

The illumination device 4 has a light emission surface 40 directed toward an object W. The illumination device 4 can make any region of the light emission surface 40 emit light, and is made of an organic EL (Electro Luminescence) for example.

The light emission control portion 12 controls the illumination device 4 so that each of plural types of partial regions 43 which are set on the light emission surface 40 emits light.

Each of the plural types of partial regions 43 at least has different positions within the light emission surface 40. Sizes of each of the plural types of partial regions 43 may be the same as each other or be different from each other. In addition, shapes of each of the plural types of partial regions 43 may be the same as each other or be different from each other. In addition, one portion of one partial region 43 may be a region in common with one portion of an adjacent partial region 43.

The imaging control portion 14 controls the camera 8 in a manner that the object W is imaged in synchronization with light emission of each of the plural types of partial regions 43. Here, "the object W is imaged in synchronization" means that the object W is imaged every time the kind of the partial regions 43 emitting light is changed.

The light emission control portion 12 and the imaging control portion 14 control the illumination device 4 and the camera 8 as described above, and thereby an input image D is generated for every partial region emitting light and a plurality of input images D are obtained.

The generation portion 18 generates the reflection profile information 70 based on a plurality of input images D. The reflection profile information 70 is the information showing relationships between a position within the light emission surface 40 and degrees of light reflected at attention sites A of the object W and incident to the camera 8 with respect to light irradiated to the object W from the aforementioned positions.

Specifically, the reflection profile information 70 is described with reference to FIG. 2. In the example shown in FIG. 2, one kind of partial region 43 is set in a position ($X_1$, $Y_1$) on the light emission surface 40. An input image D ($X_1$, $Y_1$), which is obtained when the partial region 43 set in the position ($X_1$, $Y_1$) emits light, is generated by light $L_c$ which is resulted from light $L_i$ that is irradiated from the position ($X_1$, $Y_1$) being reflected by the object W and incident to the camera 8. Accordingly, a feature amount $P_1$ is obtained from the input image D ($X_1$, $Y_1$), and the feature amount $P_1$ is a degree of the light $L_c$ that is reflected at the attention site A of the object W and incident to the camera 8 with respect to the light $L_i$ that is irradiated from the position ($X_1$, $Y_1$) on the light emission surface 40. Similarly, a feature amount $P_2$ is obtained from an input image D ($X_2$, $Y_2$) which is obtained when a partial region 43 set in a position ($X_2$, $Y_2$) emits light, and the feature amount $P_2$ is a degree of the light $L_c$ that is reflected at the attention site A of the object W and incident to the camera 8 with respect to the light $L_i$ that is irradiated from the position ($X_2$, $Y_2$).

Relationships between positions (X, Y) on the light emission surface 40 and feature amounts P are obtained from each of the plurality of input images D. That is, the reflection profile information 70 is an aggregation of information consisting of the positions (X, Y) on the light emission surface and the feature amounts P. In the example shown in FIG. 2, the feature amount $P_1$ to the feature amount $P_N$ are obtained for each of the position ($X_1$, $Y_1$) to position ($X_m$, $Y_n$) on the light emission surface 40, and the aggregation of the feature amount $P_1$ to the feature amount $P_N$ is called as the reflection profile information 70.

That is, the reflection profile information 70 is the information showing a relationship between the positions within the light emission surface 40 and degrees of light reflected at attention sites A of the object W and incident to the camera 8 with respect to light irradiated from the positions to the object W, and the reflection profile information 70 is the information related to a reflection characteristic of the attention sites A. The reflection characteristic is greatly affected by the surface state of the attention sites A, and thus the reflection profile information 70 can also be referred to as information showing the surface state of the attention sites A.

The image measurement portion 15 performs an image measurement of the object W based on the reflection profile information 70. The reflection profile information 70 is the information showing the surface state of the attention sites A. Therefore, the image measurement portion 15 can specify the surface state of the attention sites A based on the reflection profile information 70; as a result, the image measurement of the object W can be performed.

As described above, in the image processing system 1 of the embodiment, the degrees of the light reflected on the object and pass through a path to enter the imaging portion with respect to the light irradiated from the light emission surface is obtained independently for each position of the light emission surface that is irradiated, and the image measurement of the object is performed based on the information, and thus the image measurement based on a large amount of information can be performed. As a result, the performance of the image measurement can be improved.

§ 2 SPECIFIC EXAMPLE

A. One Example of Production Line in which Image Processing System is Applied

Figure 3:
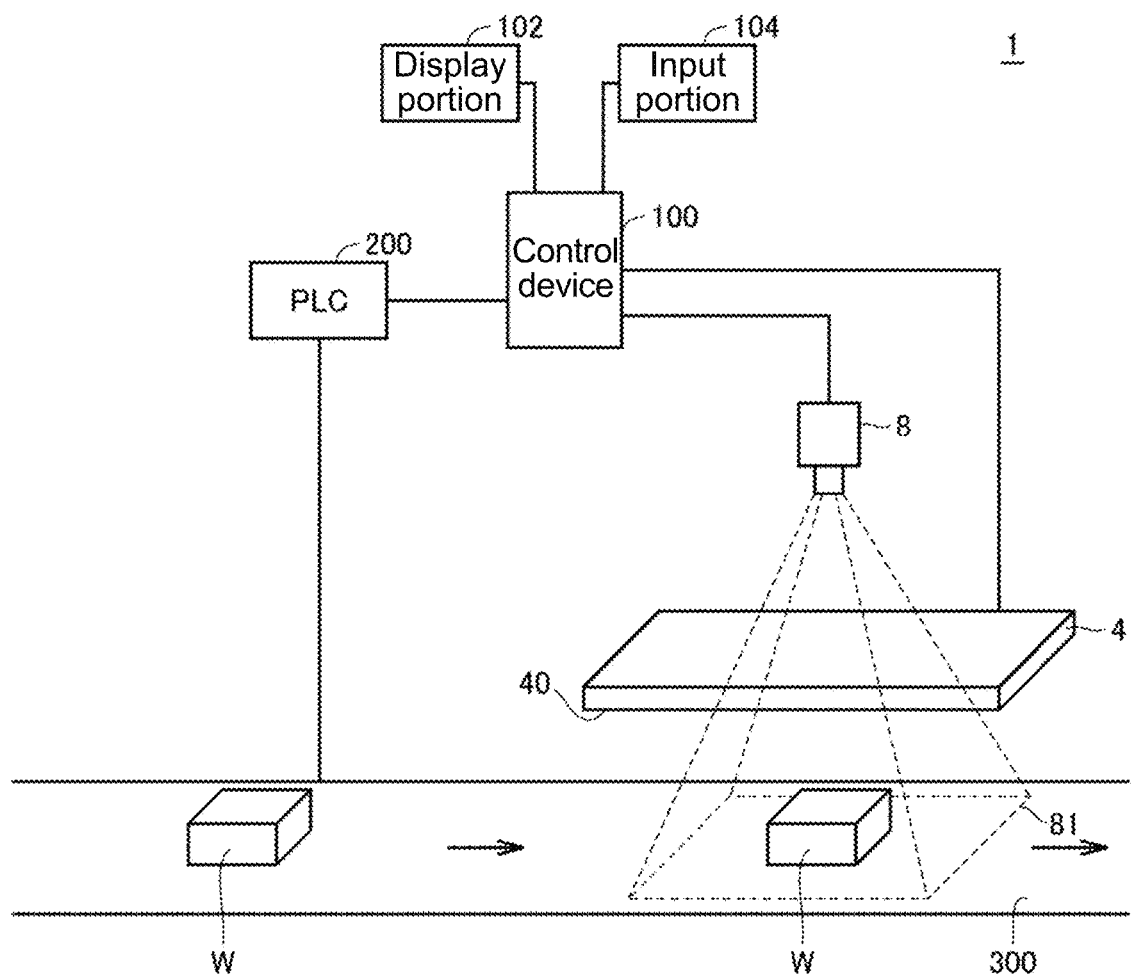
FIG. 3 is a schematic diagram showing one example of a production line, in which the image processing system of the embodiment is applied.

Next, one example of the image processing system of the embodiment is described. FIG. 3 is a schematic diagram showing one example of a production line in which the image processing system 1 of the embodiment is applied.

As shown in FIG. 3, the image processing system 1 of the embodiment includes the camera 8 which images the object W continuously carried in, the illumination device 4 which illuminates the object W, and the control device 100 which controls the illumination device 4 and the camera 8.

The camera 8 includes an optical system such as a lens, an aperture or the like and a photoelectric converter such as a CCD (Charge Coupled Device) image sensor, a CMOS (Complementary Metal Oxide Semiconductor) image sensor or the like. The photoelectric converter is a device which converts light included in an imaging visual field 81 of the camera 8 into image signals.

The illumination device 4 irradiates light to the object W disposed on a stage 300. Irradiation patterns of the light irradiated from the light emission surface 40 can be arbitrarily changed according to the irradiation patterns indicated from the control device 100.

The illumination device 4 has translucency and is typically a translucent organic EL lamp. When a side where the camera 8 is disposed is set as an upper side and a side where the object W is disposed is set as a lower side with a position where the illumination device 4 is disposed as a basis, the illumination device 4 may have translucency to a degree that the camera 8 can image, via the illumination device 4, an object which is positioned lower than the illumination device 4.

The object W, which is an inspection subject, is moved by the movable stage 300 to an inspection position where the camera 8 and the illumination device 4 are fixed. The stage 300 is controlled by a PLC 200 (Programmable Logic Controller). The PLC 200 controls the stage 300 in a manner that when the object W is conveyed to the inspection position, the stage 300 stops instantly until an appearance inspection by the image processing system 1 ends. At this moment, the control device 100 irradiates the light to the object W by the illumination device 4 and images the object W by the camera 8. The control device 100 controls the illumination device 4 to change the irradiation pattern of the light irradiated from the illumination device 4, and controls the camera 8 to image the object W by the camera 8 every time the irradiation pattern of the light is changed. The control device 100 inspects an appearance of the object W by using plural pieces of captured images that are obtained as above. In addition, the control device 100 outputs an inspection result to the PLC 200 when the appearance inspection ends. The PLC 200 makes the next object W be conveyed to the inspection position based on the output of the inspection result from the control device 100.

The control device 100 is electrically connected to a display portion 102 and an input portion 104. The display portion 102 typically consists of a liquid crystal display and displays setting contents to the user for example. The input portion 104 typically consists of a mouse and functions for inputting information relating to various settings. For example, the user can input setting information relating to settings of inspection conditions by operating the input portion 104 based on the information displayed in the display portion 102. Besides, the input portion 104 is configured by the mouse, and can also be configured by a touch panel, a keyboard or a combination thereof.

B. One Example of Hardware Configuration of Control Device

Figure 4:
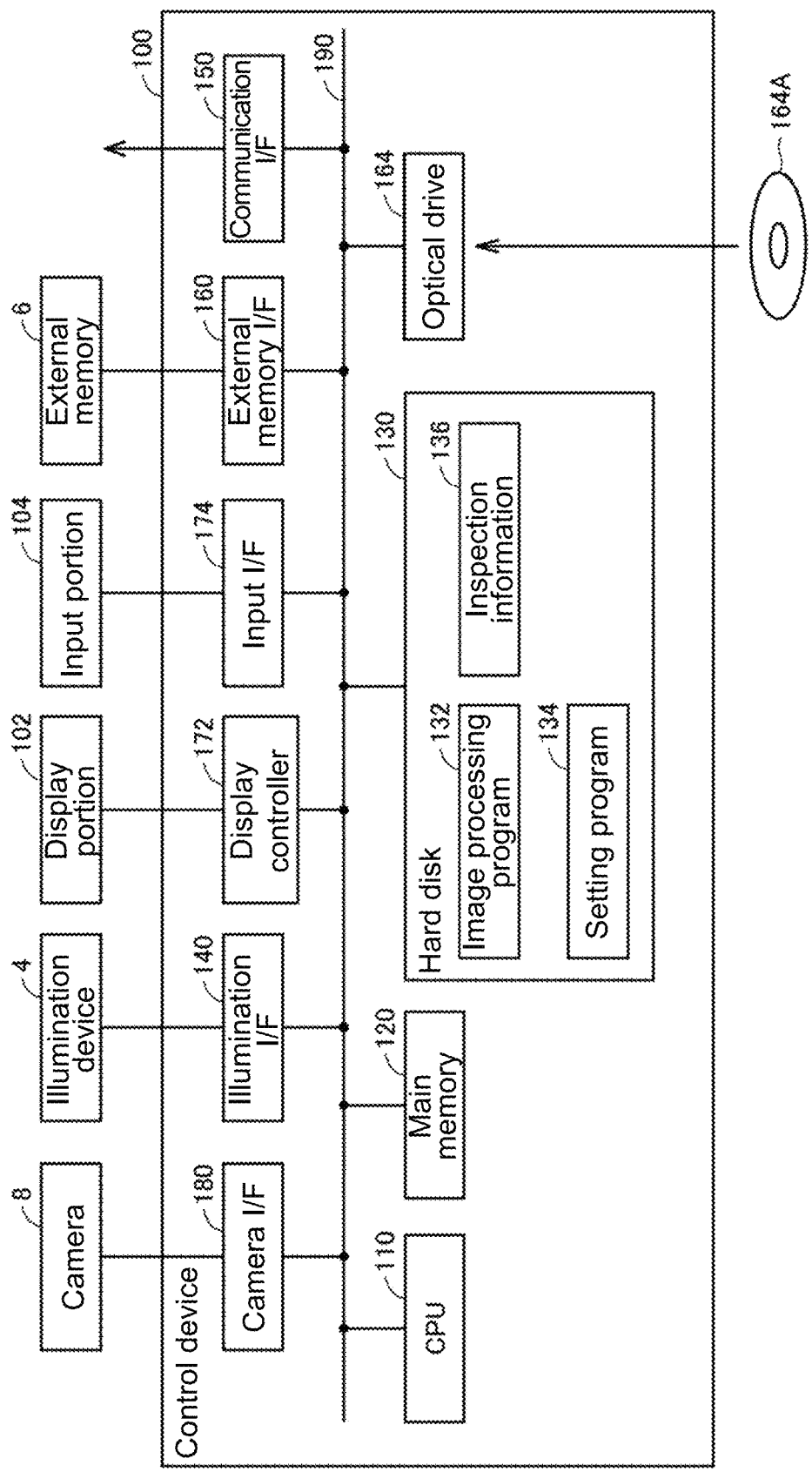
FIG. 4 is a schematic diagram showing a hardware configuration of a control device.

FIG. 4 is a schematic diagram showing a hardware configuration of the control device 100. The control device 100 includes a CPU (Central Processing Unit) 110, a main memory 120, a hard disk 130, a camera interface (I/F) 180, an illumination I/F 140, a display controller 172, an input I/F 174, a communication I/F 150, an external memory I/F 160 and an optical drive 164. Each of these portions is connected to one another via a bus 190 so that they are capable of data communication.

The CPU 110 develops a program (a code), which includes an image processing program 132 and a setting program 134 installed on the hard disk 130, in the main memory 120 and executes these programs in a predefined order, thereby performing various calculations. The main memory 120 is typically a volatile storage device such as a DRAM (Dynamic Random Access Memory) or the like.

The hard disk 130 is an internal memory included in the control device 100 and is a non-volatile storage device. The hard disk 130 includes inspection information 136 relating to the inspection conditions in addition to the image processing program 132 and the setting program 134. Besides, in addition to the hard disk 130 or in place of the hard disk 130, a semiconductor storage device such as a flash memory or the like can also be adopted.

The camera I/F 180 mediates data transmission between the CPU 110 and the camera 8. That is, the camera I/F 180 is connected to the camera 8 which generates the images. In addition, the camera I/F 180 gives commands of controlling imaging actions in the connected camera 8 according to internal commands from the CPU 110.

The illumination I/F 140 mediates the data transmission between the CPU 110 and the illumination device 4. That is, the illumination I/F 140 is connected to the illumination device 4. In addition, the illumination I/F 140 transmits, according to internal commands from the CPU 110, commands about the irradiation patterns to the connected illumination device 4. The illumination device 4 irradiates the light with the irradiation patterns based on the received commands. Besides, the illumination device 4 may be connected to the control device 100 via the camera 8. In addition, the camera 8 may be connected to the control device 100 via the illumination device 4.

The display controller 172 is connected to the display portion 102 and notifies the user of a processing result or the like in the CPU 110. That is, the display controller 172 is connected to the display portion 102 and controls display in the display portion 102.

The input I/F 174 is connected to the input portion 104 and mediates the data transmission between the CPU 110 and the input portion 104. That is, the input I/F 174 receives operation commands given by the user operating the input portion 104. The operation commands include, for example, operation commands for setting the inspection conditions.

The communication I/F 150 exchanges various data between the PLC 200 and the CPU 110. Besides, the communication I/F 150 can also exchange data between a server and the CPU 110. The communication I/F 150 includes hardware corresponding to a network for exchanging various data with the PLC 200.

The external memory I/F 160 is connected to an external memory 6 and performs processing of reading/writing of data into the external memory 6. The external memory 6 is detachable to the control device 100 and is typically a non-volatile storage device such as a USB (Universal Serial Bus) memory, a memory card or the like. In addition, various programs such as the image processing program 132 or the like are not required to be saved in the hard disk 130, and can also be saved in a server which is communicable with the control device 100, the external memory 6 which can be directly connected to the control device 100, or an optical disk 164A. For example, the various programs which are executed in the control device 100 and various parameters used in the various programs are circulated in a state of being stored in the external memory 6, and the external memory I/F 160 reads out the various program and the various parameters from the external memory 6. Elsewise, the programs or the parameters which are downloaded from the server or the like which is communicably connected to the control device 100 may be installed on the control device 100. In addition, the control device 100 can also install the programs or the parameters on the control device 100 from the optical disk 164A through the optical drive 164.

The optical drive 164 reads out from the optical disk 164A or the like the various programs stored therein and installs the various programs on the hard disk 130.

Besides, the image processing program 132 and the setting program 134 of the embodiment can also be provided by being incorporated into one portion of other programs. In addition, alternatively, part of or all of the functions provided by the execution of the image processing program 132 can also be implemented as a dedicated hardware circuit.

C. Structure of Illumination Device 4

Figure 5:
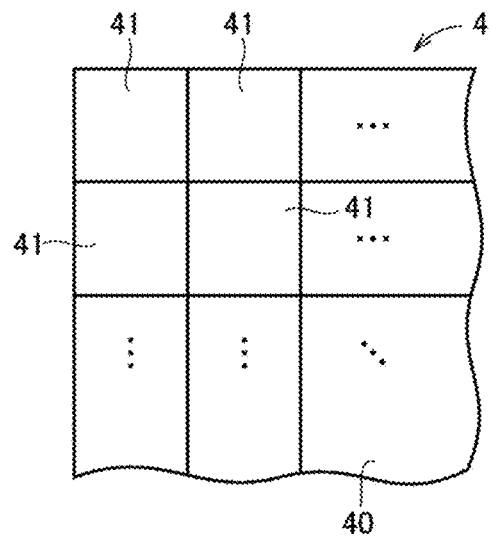
FIG. 5 is a schematic diagram in which one portion of an illumination device is enlarged.

FIG. 5 is a schematic diagram in which one portion of the illumination device 4 of the embodiment is enlarged. The illumination device 4 includes a plurality of illumination elements 41 which are disposed in a matrix shape. The illumination device 4 can light up each illumination element 41 independently. The irradiation patterns in the embodiment are determined by the illumination elements 41 to be lighted up among the plurality of illumination elements 41. In addition, in the embodiment, it is described that white light is irradiated from each illumination element 41, and the irradiation patterns refer to shading patterns on the light emission surface 40. In addition, in the embodiment, the illumination device 4 can light up or light off each illumination element 41 independently. Besides, the illumination device 4 can also adjust light emission intensity of each illumination element 41.

Each illumination element 41 includes, for example, a light emission region and a translucent region, and by making the light emission region emit light, it can be approximated as that the entire illumination element 41 emits light in terms of an illumination effect to the object W. In addition, the translucency can be kept by having the translucent region.

D. Summary of Image Measurement Method

The control device 100 inspects, based on the reflection profile information 72 obtained for a measurement position b set in the imaging visual field 81, a state of a measurement site B of the object W corresponding to the measurement position b. The measurement position b set in the imaging visual field 81 may be a position set for an image of the imaging visual field 81 by the user, or a position set in advance for the object W. In a case that the measurement position b is the position set in advance for the object W, the control device 100 may specify a posture of the object W included in the image of the imaging visual field 81 by a known method such as pattern-matching or the like, and convert the position set in advance for the object W to the measurement position b based on the specified posture of the object W.

The reflection profile information 72 is the information showing a relationship between the positions within the light emission surface 40 and degrees of the light reflected at the measurement site B of the object W and incident to the camera 8 with respect to the light irradiated from the positions to the object W, and is the information relating to a reflection characteristic of the measurement site B. The reflection characteristic changes according to the surface state of the measurement site B. Therefore, the reflection profile information 72 can also be referred to as information showing the surface state of the measurement site B.

In the following, a generation method of the reflection profile information 72 is described, and an image measurement method using the reflection profile information 72 is described.

E. Obtainment Method of Reflection Profile Information 72

Figure 6:
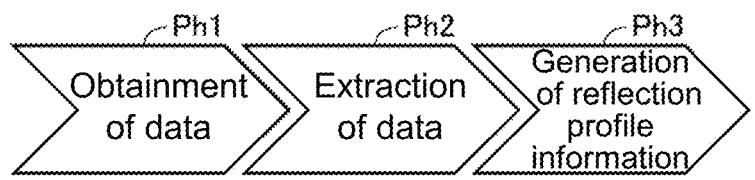
FIG. 6 is a diagram showing one example of a process for obtaining reflection profile information.

FIG. 6 is a diagram showing one example of a process for obtaining the reflection profile information 72. The process for obtaining the reflection profile information 72 includes a process Ph1 for acquiring data, a process Ph2 for extracting the data, and a process Ph3 for generating the reflection profile information 72 from the extracted data. Besides, in the following, it is described that the reflection profile information 72 which corresponds to attention positions $a_r$ in the imaging visual field 81 corresponding to attention sites $A_r$ of the object W is generated.

<Process Ph1 for Obtaining Data>

Figure 7:
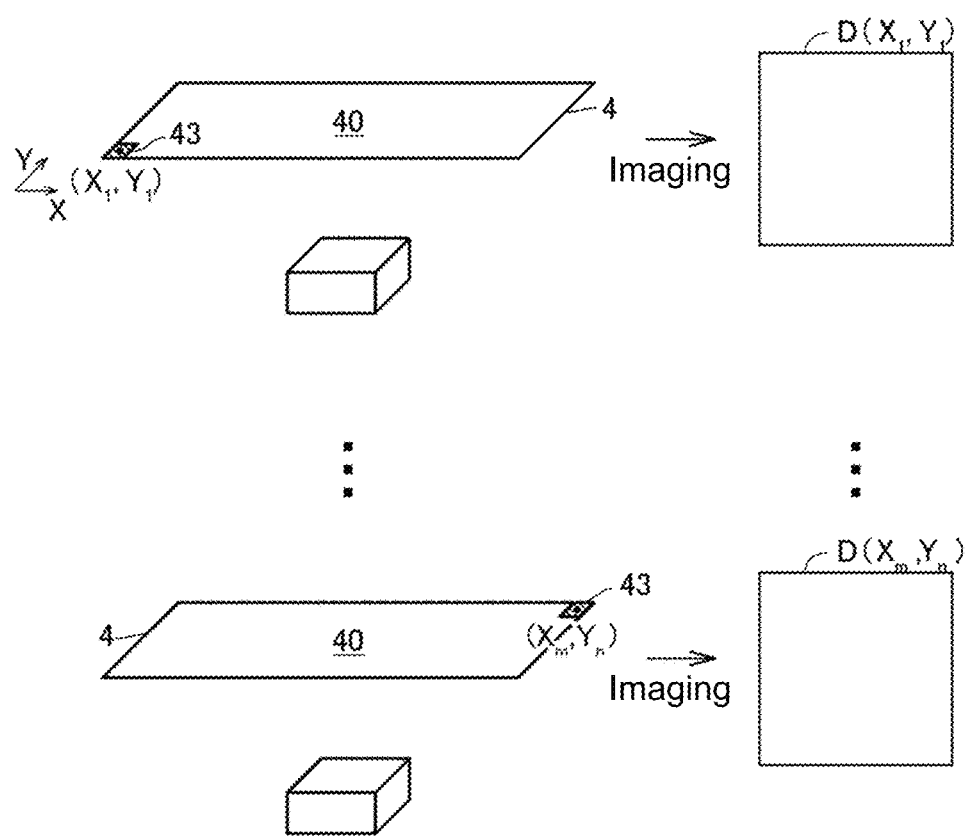
FIG. 7 is a diagram for describing an obtainment method of data.

FIG. 7 is a diagram for describing an obtainment method of data. Besides, in FIG. 7, an illustration of the camera 8 is omitted. The illumination device 4 can make only the partial regions 43 set within the light emission surface 40 emit light. The light emission surface 40 consists of an aggregation of all the illumination elements 41. On the other hand, the partial regions 43 consist of one or a plurality of illumination elements 41. That is, the partial regions 43 are a partial aggregation with respect to the aggregation of all the illumination elements 41. The illumination device 4 can light up each of the plurality of illumination elements 41 independently, and thus the illumination device 4 can make only the set partial regions 43 emit light by lighting up all the illumination elements 41 included within the partial regions 43 set on the light emission surface 40. Besides, the illumination device 4 may make all the illumination elements 41 included in the partial regions 43 lighted up with the same light emission intensity or with light emission intensities different from one another.

The control device 100 controls the illumination device 4 to light up each of plural types of partial regions 43 set on the light emission surface 40. Each of the plural types of partial regions 43 is different at least in positions within the light emission surface 40. Here, the positions of the partial regions 43 within the light emission surface 40 mean centres of the partial regions 43. A size of each of the plural types of partial regions 43 may be the same as each other or be different from each other. In addition, a shape of each of the plural types of partial regions 43 may be the same as each other or be different from each other. In addition, one portion of one partial region 43 may be a region in common with one portion of an adjacent partial region 43. In the embodiment, the shape and the size of each of the plural types of partial regions 43 are the same as one another, and each partial region 43 does not overlap with another partial region 43. Sizes of the partial regions 43 may be the sizes that can ensure a light amount to a degree at which the camera 8 can capture images from which at least one portion of the object W can be recognized when the partial regions 43 are caused to emit light. Here, because the irradiation patterns refer to the shading patterns of the light emission surface 40, making one partial region 43 emit light can be referred to as making the light emission surface 40 emit light with one irradiation pattern. In addition, each of the plural types of partial regions 43 can be referred to as an irradiation pattern different from one another.

In an example shown in FIG. 7, the control device 100 sets the partial regions 43 in each of the positions $(X_1, Y_1)$ to $(X_m, Y_n)$ on the light emission surface 40 and makes a total of m×n partial regions 43 emit light independently. The control device 100 controls the camera 8 to image in synchronization with the light emission of each of the plural types of partial regions 43, and obtains a total of m×n input images D. Here, in the embodiment, for the sake of convenience, an X direction on the light emission surface 40 is described as a movement direction of the object W in FIG. 3, and a Y direction is described as a direction orthogonal to the X direction and an irradiation direction. The input images D (X, Y) mean the images captured and obtained in a state when the partial regions 43 set in the positions (X, Y) are made to emit light. Here, in FIG. 7, a position of each of the camera 8, the illumination device 4 and the object W is fixed. That is, the imaging conditions at the time when the input image D $(X_1, Y_1)$ to the input image D $(X_m, Y_n)$ are captured are different at least in the positions on the light emission surface 40 which emits light.

<Process Ph2 for Extracting Data>

Figures 8, 9:
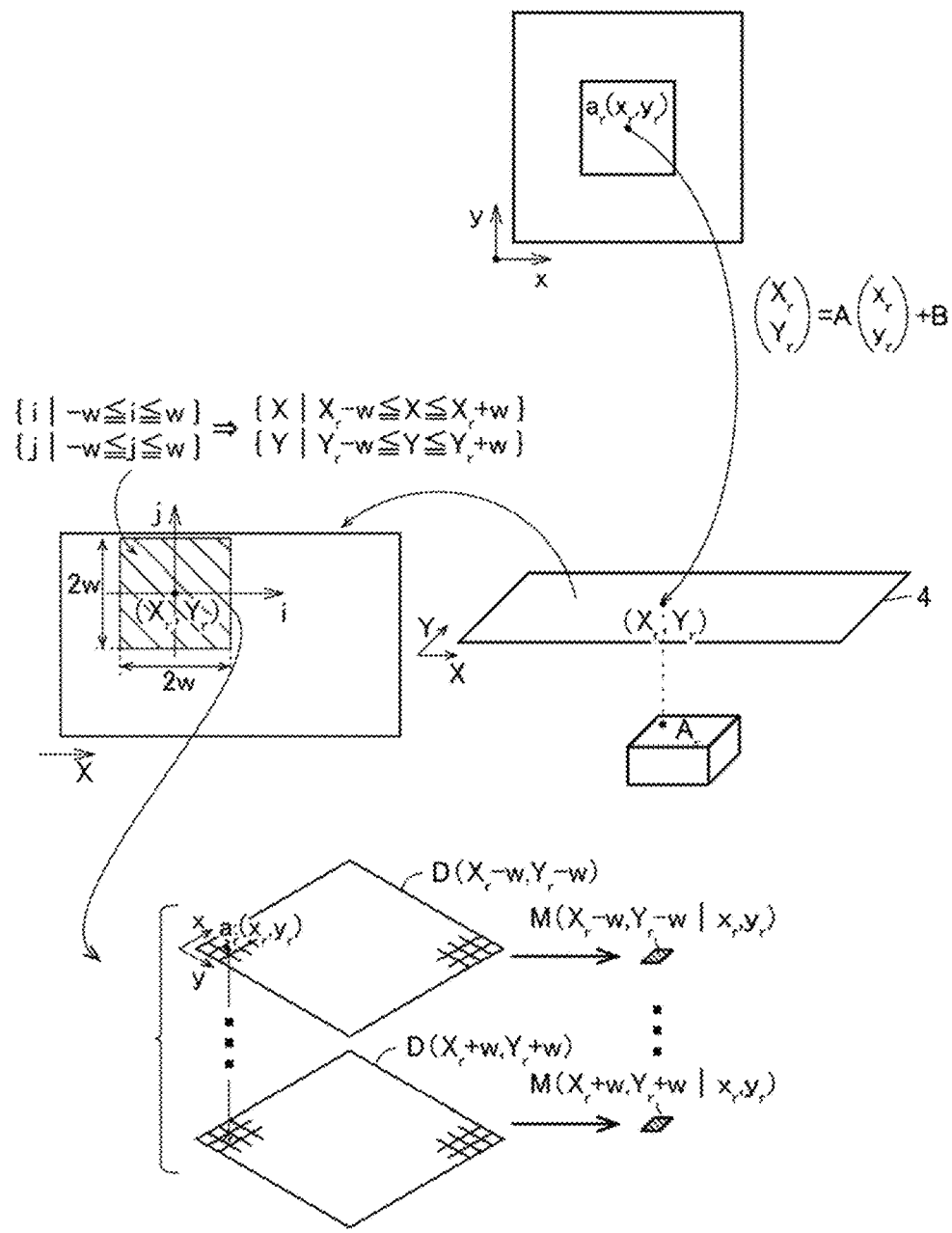
FIG. 8 is a diagram for describing an extraction method of the data.
FIG. 9 is a diagram describing a generation method of the reflection profile information.

FIG. 8 is a diagram for describing an extraction method of the data. The control device 100 extracts partial images M corresponding to the attention sites $A_r$ of the object W from the input images D included in a prescribed range within the input image D $(X_1, Y_1)$ to the input image D $(X_m, Y_n)$. Here, the partial images M corresponding to the attention sites $A_r$ of the object W are the partial regions which are extracted to include attention positions $a_r$ ($x_r$, $y_r$) in a camera coordinate system of the attention sites $A_r$ of the object W within the input images D. All the input image D ($X_1$, $Y_1$) to the input image D ($X_m$, $Y_n$) are obtained by being captured in the same imaging visual field 81. Therefore, camera coordinate positions ($x_r$, $y_r$) of the partial images M corresponding to the attention sites $A_r$ are in common in each of the input image D ($X_1$, $Y_1$) to the input image D ($X_m$, $Y_n$).

The partial images M may be data configured by one pixel or be data configured by a plurality of pixels, and may include at least pixels of the attention positions $a_r$ ($x_r$, $y_r$) corresponding to the attention sites $A_r$. The range of the partial images M is a range to the degree at which an appearance feature appears. Besides, the attention sites $A_r$ may show certain prescribed positions or show predefined ranges.

The input images D included in predefined ranges refer to the input images D which are obtained when the partial regions 43 set in positions included in the predefined ranges taking the positions ($X_r$, $Y_r$) on the light emission surface 40 corresponding to the attention positions $a_r$ ($x_r$, $y_r$) as a reference position is made to emit light. The reference position herein refers to, for example, an origin (0, 0). For example, a relation of formula (1) is established between the attention position $a_r$ ($x_r$, $y_r$) in the camera coordinate system of the attention site $A_r$ and the corresponding position ($X_r$, $Y_r$) on the light emission surface 40. Therefore, the corresponding position ($X_r$, $Y_r$) on the light emission surface 40 can be obtained from the attention position $a_r$ ($x_r$, $y_r$).

(Expression 1)

$$\begin{pmatrix} X_r \\ Y_r \end{pmatrix} = A \begin{pmatrix} x_r \\ y_r \end{pmatrix} + B \quad (1)$$

Coefficients A, B are calibration parameters, and can be calculated by calculation based on a position relationship between the camera 8 and the illumination device 4 after the positions of the camera 8 and the illumination device 4 are fixed, or obtained by performing a calibration operation. Besides, the formula (1) is one example, and the positions on the light emission surface 40 which are corresponding to the positions within the camera coordinate system can also be defined in advance without using the formula (1).

Here, the coordinate system which takes the position ($X_r$, $Y_r$) on the light emission surface 40 corresponding to the attention position $a_r$ ($x_r$, $y_r$) as the reference position is set as a coordinate ij. A range shown in Formula (2) is set as the prescribed range taking the position ($X_r$, $Y_r$) on the light emission surface 40 as the reference position.

(Expression 2)

$$\{i | -\overline{\omega} \leq i \leq \overline{\omega}\}$$

$$\{j | -\overline{\omega} \leq j \leq \overline{\omega}\} \quad (2)$$

In the coordinate ij, the position ($X_r$, $Y_r$) is set as the reference position (origin), and thus the range shown in formula (2) can be converted to a range shown in formula (3).

(Expression 3)

$$\{X | X_r - \overline{\omega} \leq X \leq X_r + \overline{\omega}\}$$

$$\{Y | Y_r - \overline{\omega} \leq Y \leq Y_r + \overline{\omega}\} \quad (3)$$

The control device 100 extracts the partial image M of the attention position $a_r$ ($x_r$, $y_r$) from each of the input image D ($X_r$−w, $Y_r$−w) to the input image D ($X_r$+w, $Y_r$+w) included in the range shown in formula (3), and extracts the partial image M ($X_r$−w, $Y_r$−w|$x_r$, $y_r$) to the partial image M ($X_r$+w, $Y_r$+w|$x_r$, $y_r$). Besides, it may be that only the input images D included in the range shown in formula (3) are generated. Here, the left of a vertical bar in brackets of the partial images M (X, Y|$x_r$, $y_r$) means the positions (X, Y) of the light emission surface 40 which emit light when the input images D which are extraction origins are captured. The right of the vertical bar in the brackets of the partial images M (X, Y|$x_r$, $y_r$) means the attention positions a (x, y) within the input images D which are targets at the time of extracting the partial images M. That is, the partial images M (X, Y|$x_r$, $y_r$) mean the partial regions of the input images D (X, Y) which are extracted to include attention positions $a_r$ ($x_r$, $y_r$) within the input images D (X, Y).

(Calibration Method)

Here, one example of calibration method for obtaining a correspondence relationship between the positions (x, y) in the imaging visual field 81 and the positions (X, Y) on the light emission surface 40 is described.

The control device 100 sequentially sets the partial regions 43 to different positions on the light emission surface 40 and makes the partial regions 43 emit light, and controls the camera 8 to sequentially generate the images of the imaging visual field 81 corresponding to the sequential light emission. In the inspection position, a basis object called a target plate for the calibration may be disposed to perform the calibration, or the object W which is an inspection target may be disposed to perform the calibration.

The control device 100 extracts the luminance values from each of the plurality of pixels included in the plurality of images which is obtained corresponding to the sequential lighting up. The control device 100 compares the luminance values of the pixels positioned in (x, y) within the plurality of images, and prescribes the pixels which have the highest luminance values. The control device 100 associates the position (X, Y) where the partial regions 43 are set when the images corresponding to the prescribed pixels are obtained with the positions (x, y) of the pixels within the images. The control device 100 can obtain correspondence relationships between the camera coordinate system and the illumination coordinate system by performing the same processing to all the pixels within the obtained images. Calibration parameters may be calculated by making the correspondence relationships between the camera coordinate system and the illumination coordinate system linearly approximated. Besides, the processing described above is performed for every pixel, and the processing described above can also be performed for every plural pixels taking the plural pixels as one unit.

Because the calibration is performed as described above, the light irradiated from the positions (X, Y) on the light emission surface 40 corresponding to the attention positions a is the light with a highest light amount reflected at the attention positions a and incident to the camera 8 among the light incident to the attention positions a.

<Process Ph3 for Generating Reflection Profile Information 72 from Extracted Data>

FIG. 9 is a diagram for describing a generation method of the reflection profile information 72. The control device 100 extracts feature amounts p from each of the partial image M ($X_r$−w, $Y_r$−w|$x_r$, $y_r$) to the partial image partial image M ($X_r$+w, $Y_r$+w|$x_r$, $y_r$). The feature amounts p are values showing intensities of the light reflected at the attention sites A and incident to the camera 8 among the light incident to the attention sites A from the partial regions 43 set on the light emission surface 40, and include, for example, luminance values, or values obtained by standardizing the luminance values. In addition, the feature amounts p can also be information obtained after performing a pre-processing such as a spatial filtering or the like on the partial images M. Here, the feature amounts p (x, y|X, Y) mean feature amounts extracted from the partial images M (X, Y|x, y).

In the embodiment, an aggregation of the feature amount p (x, y|$X_r$−w, $Y_r$−w) to the feature amount p (x, y|$X_r$+w, $Y_r$+w) is the reflection profile information 72. That is, the control device 100 generates the reflection profile information 72 by extracting the feature amount p (x, y|$X_r$−w, $Y_r$−w) to the feature amount p (x, y|$X_r$+w, $Y_r$+w) from the partial image M ($X_r$−w, $Y_r$−w|x, y) to the partial image M ($X_r$+w, $Y_r$+w|x, y).

Here, the left of the vertical bar in the brackets of the feature amounts p (x, y|X, Y) means the attention positions a (x, y) which are positions of the attention sites A within the imaging visual field 81. The right of the vertical bar in the brackets of the feature amounts p (x, y|X, Y) means which positions (X, Y) on the light emission surface 40 are made to emit light to obtain the feature amounts p. That is, the feature amounts p (x, y|X, Y) are the values based on the light incident from the positions (X, Y) on the light emission surface 40, which are among the light incident to the attention sites A (the attention positions a (x, y)).

When the coordinate XY is converted to the coordinate ij, the feature amount p ($x_r$, $y_r$|$X_r$−w, $Y_r$−w) to the feature amount p ($x_r$, $y_r$|$X_r$+w, $Y_r$+w) can be expressed as the feature amount p ($a_r$|−w, −w) to the feature amount p ($a_r$|w, w). The feature amount p ($a_r$|−w, −w) refers to a value based on the light within the light incident to the attention site $A_r$, which is incident from the position (−w, −w) in the coordinate ij taking the position ($X_r$, $Y_r$) on the light emission surface 40 corresponding to the attention position $a_r$ ($x_r$, $y_r$) as the reference position.

Here, the input images D (X, Y) are generated by the light incident to the camera 8 among the light irradiated from the partial regions 43 set in the positions (X, Y) on the light emission surface 40 and reflected at the attention sites A. In addition, the feature amounts p (x, y|X, Y) are values showing intensities of the light reflected at the attention sites A and incident to the camera 8 among the light incident to the object W from the positions (X, Y) on the light emission surface 40. That is, the feature amounts p (x, y|X, Y) can be referred to as the information showing degrees of the light reflected at the attention sites A and incident to the camera 8 with respect to the light irradiated from the positions (X, Y). Therefore, the reflection profile information 72, which is configured by the aggregation of the feature amount p (x, y|$X_r$−w, $Y_r$−w) to the feature amount p (x, y|$X_r$+w, $Y_r$+w), is referred to as the information which shows the relationships between the positions (X, Y) within the light emission surface 40 which are the irradiation positions, and the degrees of the light reflected at the attention sites A and incident to the camera 8 with respect to the light irradiated from the irradiation positions.

In addition, the reflection profile information 72 is represented not by the coordinate XY on the light emission surface 40, but by the coordinate ij taking the position on the light emission surface 40 having a correspondence relationship with the attention position a as the reference position. The coordinate ij taking the position on the light emission surface 40 having the correspondence relationship with the attention position a as the reference position can also be referred to as a coordinate corresponding to a relative position to the attention site A. Because the reflection profile information 72 is represented by the coordinate ij, the reflection profile information 72 reflecting a change of the position relationship between the light emission surface 40 and the attention site A can be obtained. As a result, the reflection profile information 72 obtained for each attention site A can be compared with each other in the same dimension regardless of the position relationship between the light emission surface 40 and the attention site A.

In addition, the range of the feature amounts p included in the reflection profile information 72 is set to the range shown by the formula (2), so that the reflection profile information 72 obtained for every attention site A is the information in the range the same with one another. As a result, the control device 100 can directly compare the reflection profile information 72 obtained for every attention site A with one another.

F. Summary of Image Measurement Method

The image measurement method executed based on the reflection profile information 72 is described. In the embodiment, the attributes of the measurement position b are inspected based on reflection profile reference information 80 registered in advance for each attribute. Here, the attributes show states of the object. The attributes may be classified simply according to whether there is a defect, or may be classified more specifically as to whether there is a scratch or dirt. In addition, the reflection profile reference information 80 is information set as a reference when the image measurement is performed.

Specifically, the control device 100 calculates a similarity S between the reflection profile information 72 and the reflection profile reference information 80, and judges based on the similarity S whether the measurement site B which is the attention site A corresponding to the reflection profile information 72 is classified into the attributes shown by the reflection profile reference information 80.

G. Flow of Calculation Method of Similarity S

The control device 100 calculates the similarity S between the reflection profile information 72 and the reflection profile reference information 80. Specifically, the similarity S is calculated by comparing a model image 810 which is one example of the reflection profile reference information 80 and a mapping image 540 shown by a representation form in which the reflection profile information 72 is mapped in the coordinate ij with a known pattern matching.

<Conversion of Reflection Profile Information 72 to Mapping Image 540>

Figure 10:
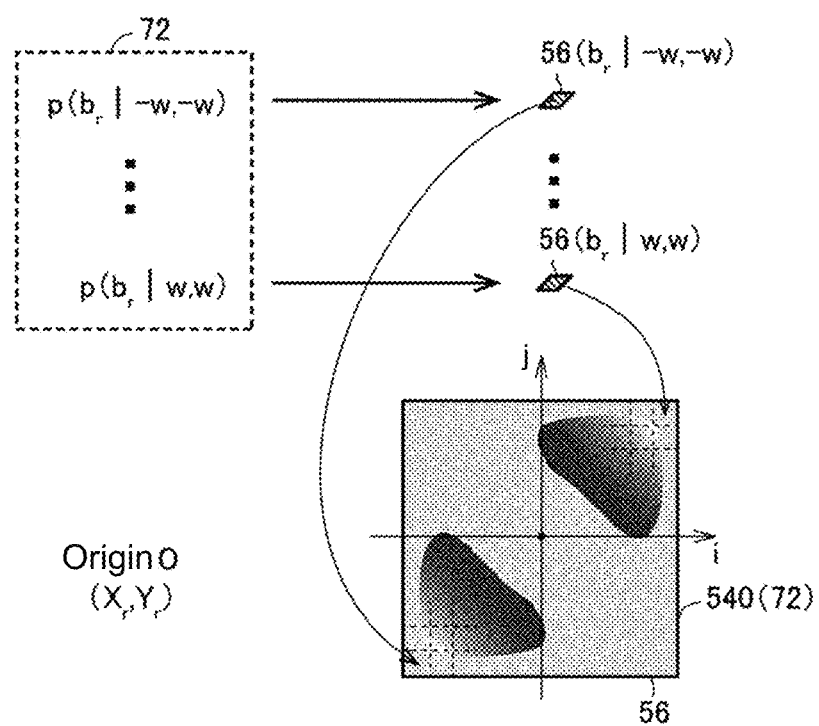
FIG. 10 is a diagram showing one example of a method for converting the reflection profile information to a mapping image.

FIG. 10 is a diagram showing one example of the method for converting the reflection profile information 72 to the mapping image 540. In the example shown in FIG. 10, the control device 100 generates the mapping image 540 by mapping the feature amount p to the coordinate ij with respect to the coordinate system in which the position ($X_r$, $Y_r$) on the light emission surface 40 corresponding to the measurement position $b_r$ ($x_r$, $y_r$) is used as a reference position. Here, the measurement position $b_r$ refers to a position in the imaging visual field 81 of the measurement site $B_r$ and corresponds to the attention position a. The mapping image 540 is an image in which a gray value 56 shown by a gray degree in accordance with magnitude of the feature amount p is mapped in the coordinate ij. For example, the gray value 56 ($b_r$|−w, −w) corresponding to the magnitude of the feature amount p ($b_r$,|−w, −w) is mapped to the position (−w, −w) of the coordinate ij. The control device 100 converts each of the feature amount p ($b_r$,|−w, −w) to the feature amount p ($b_r$,|w, w) into the gray value 56, and obtains the gray value 56 ($b_r$,|−w, −w) to the gray value 56 ($b_r$,|w, w). The control device 100 generates the mapping image 540 by mapping each of the gray value 56 ($b_r$,|−w, −w) to the gray value 56 ($b_r$,w, w) in the coordinate ij. Besides, in FIG. 10, in order to clarify a situation that the gray value 56 is mapped, the gray value 56 is shown as an image having a prescribed area (the same applies to FIG. 11-FIG. 14, FIG. 16, FIG. 19, and FIG. 20).

<Generation Method of Model Image 810>

The model image 810 is an image in which the reflection profile information 72 for a specific site $B_k$ in which the attribute is known in advance is converted to the mapping image 540. Besides, the specific site $B_k$ is the attention site A in which the attribute is known in advance.

For example, the reflection profile information 72 of a specific position $b_k$ corresponding to the specific site $B_k$ on which a scratch is formed within the image obtained by imaging the object W on which the scratch is formed is obtained by the above method and is converted to the mapping image 540 by the above method, thereby the model image 810 is generated.

Figure 11:
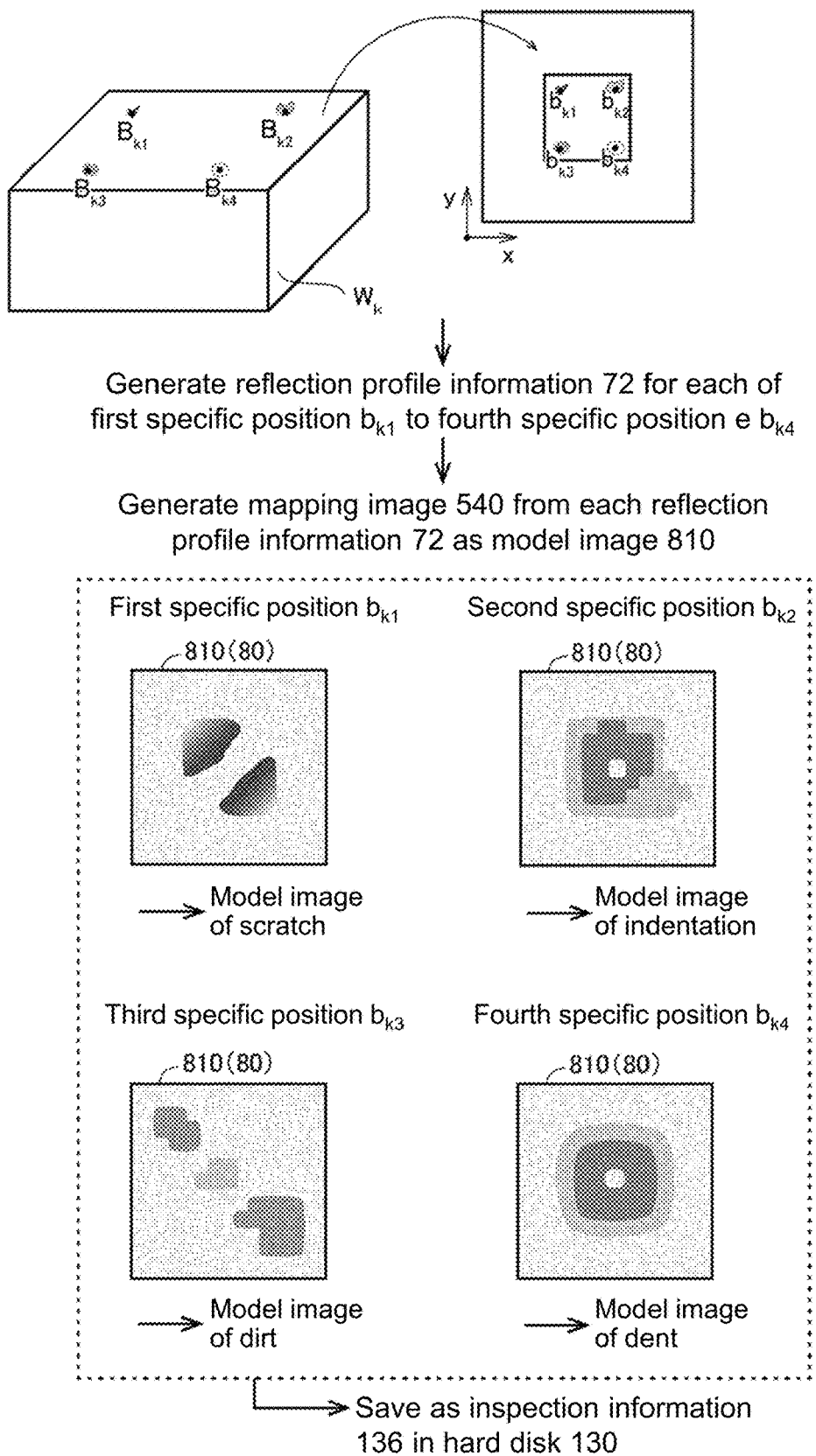
FIG. 11 is a diagram for describing a generation method of a model image.

FIG. 11 is a diagram for describing a generation method of the model image 810. Besides, the position of the specific site $B_k$ within the image is referred to as the specific position $b_k$ below. In addition, the object W including the specific site $B_k$ is also referred to as a reference object $W_k$.

In the example shown in FIG. 11, a scratch is arranged on the first specific site $B_{k1}$ of the reference object $W_k$, an indentation is arranged on the second specific site $B_{k2}$, dirt is arranged on the third specific site $B_{k3}$, and a dent is arranged on the fourth specific site $B_{k4}$.

The control device 100 obtains, by the same method as the method for obtaining the mapping image 540 shown in FIG. 6 to FIG. 10, the mapping image 540 for each of the first specific position $b_{k1}$ to the fourth specific position $b_{k4}$ corresponding to the first specific site $B_{k1}$ to the fourth specific site $B_{k4}$. The extraction ranges of the partial images M are identical to each other in each of the first specific position $b_{k1}$ to the fourth specific position $b_{k4}$.

The control device 100 stores the mapping image 540 obtained for each of the first specific position $b_{k1}$ to the fourth specific position $b_{k4}$ as the model image 810 of a defect arranged in each specific position $b_k$. For example, the mapping image 540 of the first specific position $b_{k1}$ is stored as the model image 810 of the scratch.

The model image 810 is stored, for example, as the inspection information 136 in a hard disk 130 which is one example of the storage portion. Besides, the storage portion may also be a server capable of communicating with the control device 100, or an external memory 6 capable of being directly connected to the control device 100, or an optical disk 164A and the like.

In addition, in the example shown in FIG. 11, one model image 810 is saved corresponding to one attribute. That is, one reflection profile reference information 80 is saved corresponding to one attribute. For example, the reflection profile information 72 may be obtained for each of a plurality of specific sites $B_k$ showing a common attribute, and each of the plurality of reflection profile information 72 corresponds as the reflection profile reference information 80 of the common attribute. That is, a plurality of reflection profile reference information 80 may correspond to one attribute.

In addition, the reflection profile reference information 80 is set as the information obtained from one reflection profile information 72, but the reflection profile reference information 80 may also be the information in which the plurality of reflection profile information 72 is expressed statistically. For example, the reflection profile information 72 may be obtained for each of the plurality of specific sites $B_k$ showing a common attribute, and a statistic value of the plurality of reflection profile information that is obtained is set as the reflection profile reference information 80.

<Calculation of Similarity>

The control device 100 compares the generated mapping image 540 and the model image 810, and calculates a similarity S between the mapping image 540 and the model image 810. The calculation of the similarity S is performed by a pattern matching. The similarity S may be, for example, a correlation value of the mapping image 540 with the model image 810. The correlation value is calculated using a normalized cross-correlation for example. In addition, the similarity S may be, for example, a degree of coincidence of the information obtained after a preprocessing such as a spatial filter is performed on each of the mapping image 540 and the model image 810.

H. Image Measurement Using Model Image 810

Figure 12:
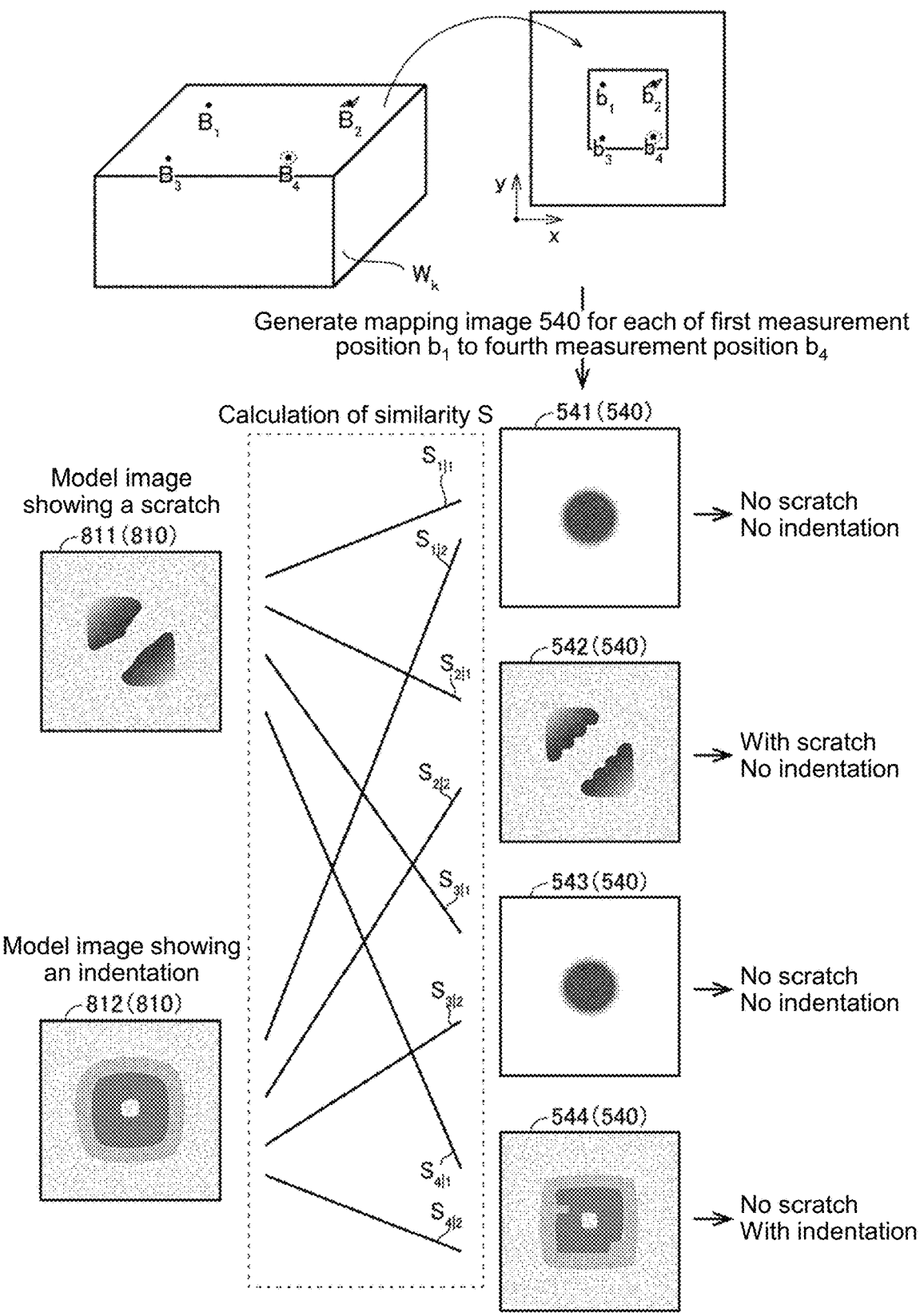
FIG. 12 is a diagram showing one example of an image measurement using the model image.

FIG. 12 is a diagram showing one example of the image measurement using the model image 810. For example, the measurement position $b_1$ to the measurement position $b_4$ are set in advance. The control device 100 generates the mapping image 540 of each of the measurement position $b_1$ to the measurement position $b_4$ and obtains the first mapping image 541 to the fourth mapping image 544. Here, the first mapping image 541 refers to the mapping image 540 to the measurement position $b_1$; similarly, the second mapping image 542 refers to the mapping image 540 of the measurement position $b_2$, the third mapping image 543 refers to the mapping image 540 of the measurement position $b_3$, and the fourth mapping image 544 refers to the mapping image 540 of the measurement position $b_4$.

In addition, a first model image 811 and a second model image 812 are stored as the inspection information 136 in a storage portion such as the hard disk 130. The first model image 811 is the model image 810 showing a scratch, and the second model image 812 is the model image 810 showing an indentation.

The first mapping image 541 to the fourth mapping image 544 of each of the measurement position $b_1$ to the measurement position $b_4$ are compared with the first model image 811 and the second model image 812, and the similarity S of each mapping image 540 with each model image 810 is calculated. The control device 100 judges the attributes of the measurement site $B_1$ to the measurement site $B_4$ corresponding to the measurement position $b_1$ to the measurement position $b_4$ based on whether the calculated similarity S exceeds a predetermined threshold. For example, the control device 100 judges whether there is a scratch at the measurement site $B_1$ corresponding to the measurement position $b_1$ based on a similarity $S_{1|1}$ of the first mapping image 541 with respect to the first model image 811, judges whether there is an indentation at the measurement site $B_1$ based on a similarity $S_{1p}$ of the first mapping image 541 with respect to the second model image 812. For example, when the calculated similarity S is higher than the predetermined threshold, the control device 100 judges that the mapping image 540 and the model image 810 are similar, and determines that the measurement site B corresponding to the mapping image 540 is classified to the attribute corresponding to the model image 810.

In the example shown in FIG. 12, it is judged that any of the first mapping image 541 and the third mapping image 543 is not similar to any of the first model image 811 and the second model image 812 based on the similarity S ($S_{1|1}$, $S_{1|2}$, $S_{3|1}$, $S_{3|2}$), and a determination is made that there is no scratch or indentation at the measurement site $B_1$ and the measurement site $B_3$. On the other hand, it is judged that the second mapping image 542 is similar to the first model image 811 and is not similar to the second model image 812 based on the similarity S ($S_{2|1}$, $S_{2|2}$), and a determination is made that there is no indentation but a scratch at the measurement site $B_2$. Similarly, it is judged that the fourth mapping image 544 is similar to the second model image 812 and is not similar to the first model image 811 based on the similarity S ($S_{4|1}$, $S_{4|2}$), and a determination is made that there is no scratch but an indentation at the measurement site $B_4$.

Accordingly, the control device 100 obtains the similarity S with the model image 810 for each of a plurality of mapping images 540 obtained for each measurement position b corresponding to the measurement site B. The control device 100 performs the image measurement based on the calculated similarity S. Since the mapping image 540 is obtained for each measurement position b, the control device 100 can specify not only whether there is a defect but also a type of the defect and a position of the defect.

Besides, in the example shown in FIG. 12, the measurement site B is determined in advance, but the measurement site B may also be set in a manner that the entire surface of the object W can be measured by setting all the measurement sites B.

I. Registration Method of Model Image 810

The specific position $b_k$ when the model image 810 is generated may be set in advance or be indicated by the user. For example, from the image obtained by imaging the object W, the user visually indicates the specific site $B_k$ which is classified to a prescribed attribute from the image, and the indicated position may be set as the specific position $b_k$. In addition, when the mapping image 540 of the specific position $b_k$ is registered as the model image 810, the user may specify an attribute from the image obtained by imaging the object W, and the specified attribute and the model image 810 are associated and stored. Besides, in the following, storage of the model image 810 to the storage portion is also referred to as a registration of the model image 810.

Figure 13:
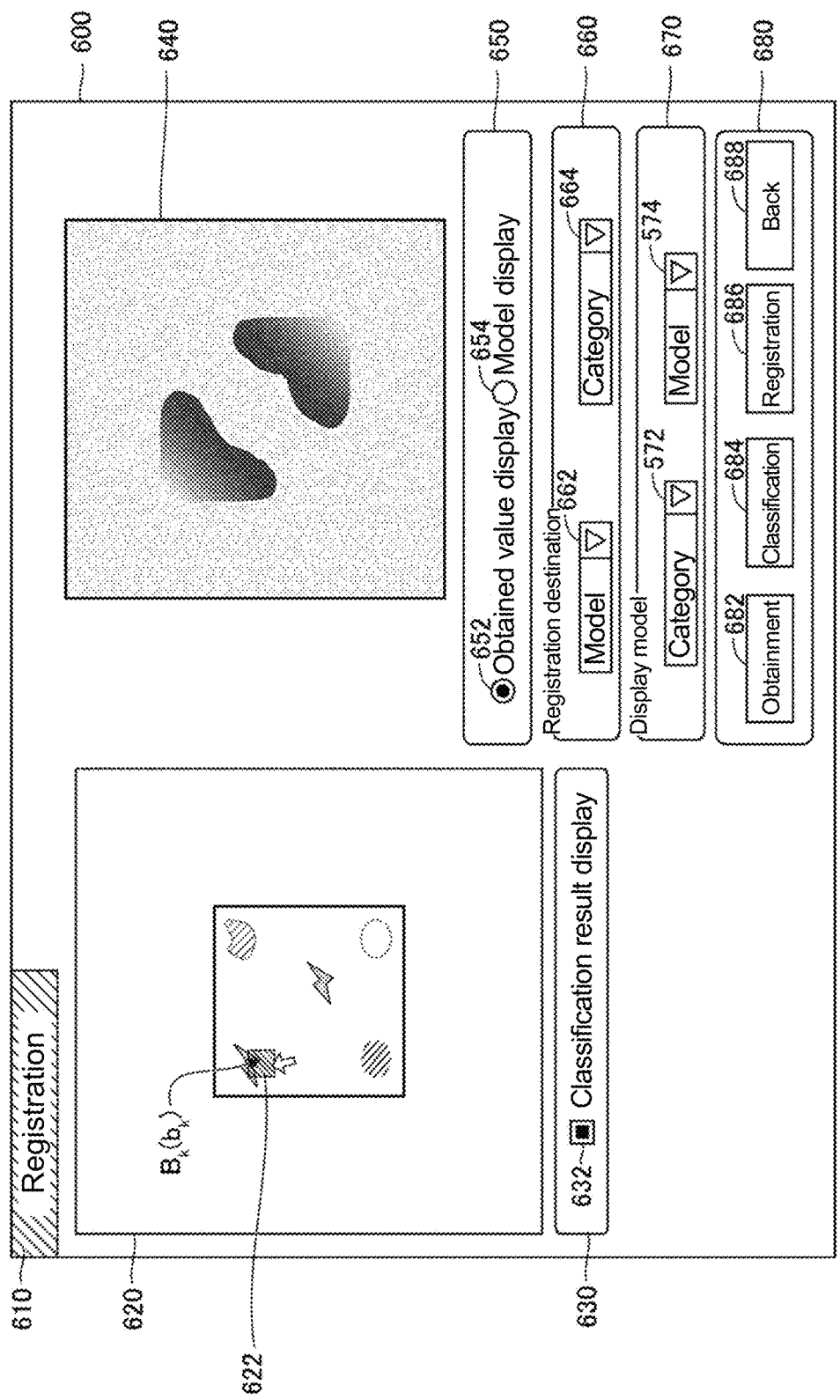
FIG. 13 is a diagram showing one example of a user interface screen during registration of the model image.

FIG. 13 is a diagram showing one example of a user interface screen 600 during the registration of the model image. The user interface screen 600 shown in FIG. 13 is displayed on the display portion 102 by selecting a registration tab 610. Besides, other tabs except the registration tab 610 are omitted in FIG. 13, but tabs related to other setting such as a "camera setting" tab for setting the camera 8 or an "image processing setting" tab for setting processing content executed on the obtained image data may be arranged.

The user interface screen 600 includes a first image display region 620, a first display setting region 630, a second image display region 640, a second display setting region 650, a registration destination selection region 660, a display image selection region 670, and an instruction region 680.

The first image display region 620 is a region for displaying the image captured by the camera 8. The user operates a mouse which is one example of the input portion 104 to visually specify and select the specific position $b_k$ that corresponds to the specific site $B_k$ from the image displayed on the first image display region 620. In FIG. 13, the selection region 622 showing the selected specific position $b_k$ is displayed on the first image display region 620. Besides, the specific site $B_k$ may show a certain specific position, or show a prescribed range. That is, the specific position $b_k$ corresponding to the specific site $B_k$ may be configured from one pixel, or may be configured from a plurality of pixels. Besides, the selection region 622 is a shape corresponding to the range of the specific position $b_k$. For example, as for the selection region 622, when the specific position $b_k$ is configured from one pixel, the selection region 622 is shown by a point, and when the specific position $b_k$ is configured from the plurality of pixels, the selection region 622 is shown by a region of a prescribed range. Besides, the specific site $B_k$ shows a range to the degree at which reflection characteristics according to the surface state of the specific site $B_k$ are reflected in the reflection profile information 72.

When an obtainment button 682 of the instruction region 680 is selected in a state that the specific position $b_k$ is selected, the control device 100 generates the mapping image 540 of the position shown by the selection region 622. At this time, when an obtainment value display tab 652 is selected in the second display setting region 650, the mapping image 540 of the specific position $b_k$ shown by the selection region 622 and generated by the control device 100 is displayed on the second image display region 640.

The second image display region 640 is a region for displaying the mapping image 540. The second display setting region 650 is a region for setting a type of the mapping image 540 displayed on the second image display region 640. The obtainment value display tab 652 is a tab for displaying the mapping image 540 of the position shown by the selection region 622 of the first image display region 620 on the second image display region 640. A model display tab 654 is a tab for displaying the model image 810 selected in the display image selection region 670 on the second image display region 640.

Besides, it may be configured so as to be able to select both the obtainment value display tab 652 and the model display tab 654, and the mapping image 540 and the model image 810 may be displayed on the second image display region 640 in mutually different forms when both the obtainment value display tab 652 and the model display tab 654 are selected. In addition, the user interface screen 600 may include a region for displaying the mapping image 540 of the specific position $b_k$ selected in the first image display region 620 and a region for displaying the model image 810 selected in the display image selection region 670.

The registration destination selection region 660 is a region used for registering a registration destination when the mapping image 540 displayed on the second image display region 640 is registered as the model image 810, and a measurement result which is an attribute shown by the model image 810. For example, a pull-down menu is displayed on the display portion 102 when the user selects a model tab 662 from the input portion 104 such as the mouse, and the user can select a registration destination when the mapping image 540 displayed on the second image display region 640 is registered from the pull-down menu. In addition, the pull-down menu is displayed on the display portion 102 when the user selects a category tab 664, and the user can select a category when the mapping image 540 displayed on the second image display region 640 is registered from the pull-down menu. The category is information showing the measurement result and is information showing attribute of the specific site $B_k$. When a registration button 686 is operated in a state that the registration destination and the category are selected, the mapping image 540 displayed on the second image display region 640 is saved as the model image 810 of the selected category. Besides, it may be configured so as to be able to change a name of the category in the pull-down menu displayed when the category tab 664 is selected.

The display image selection region 670 is a region for selecting the model image 810 displayed on the second image display region 640. For example, the pull-down menu is displayed on the display portion 102 when the user selects a category tab 572 from the input portion 104 such as the mouse, and the user can select a category of the model image 810 to be displayed on the second image display region 640 from the pull-down menu. The model tab 574 cannot be selected when only one model image 810 is registered with respect to the selected category, but the model tab 574 can be selected when a plurality of model images 810 are registered with respect to the selected category. When the model tab 574 is selected, the user can select the model image 810 to be displayed on the second image display region 640 from the pull-down menu.

The instruction region 680 includes an obtainment button 682, a classification button 684, a registration button 686, and a back button 688.

The obtainment button 682 is a button for acquiring the mapping image 540 of the position shown by the selection region 622. When the obtainment button 682 is operated, the control device 100 generates the mapping image 540 of the position shown by the selection region 622. At this time, as long as the obtainment value display tab 652 of the second display setting region 650 is selected, the generated mapping image 540 of the position shown by the selection region 622 is displayed on the second image display region 640.

The registration button 686 is a button for registering the mapping image 540 displayed on the second image display region 640 as the model image 810 in the condition shown in the registration destination selection region 660. When the registration button 686 is operated, the mapping image 540 displayed on the second image display region 640 is saved, as the model image 810 of the category selected in the registration destination selection region 660, in the registration destination selected in the registration destination selection region 660. When the back button 688 is selected, for example, the user interface screen 600 is deleted from the display portion 102.

The classification button 684 is a button for acquiring a result obtained when the image measurement is performed on the image displayed on the first image display region 620. For example, when the classification button 684 is operated, the image measurement is performed and an image measurement result of the object W positioned in the imaging visual field 81 is obtained. At this time, when a classification result display tab 632 selected in the first display setting region 630, the obtained image measurement result is reflected in the first image display region 620.

The mapping image 540 is generated for all the positions in the imaging visual field 81, and it is judged whether the sites (surfaces) on the object W corresponding to the respective positions are classified to the attributes corresponding to the model image 810 based on the similarity S with the model image 810 which is registered based on the mapping image 540, thereby performing the image measurement to the object W positioned in the imaging visual field 81. All the positions in the imaging visual field 81 may be the respective pixel position in the imaging visual field 81 or a region configured by a plurality of pixels. In addition, at least the region in which the object W is positioned may be used as the measurement object when not all the regions in the imaging visual field 81 are used as the measurement object. In addition, it may be configured so that a range to be measured is indicated by the user.

Figure 14:
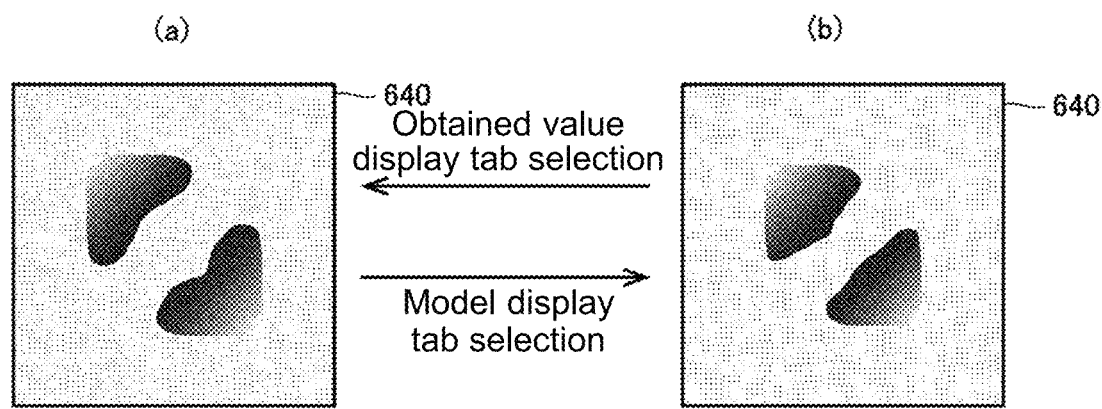
FIG. 14 is a diagram showing a display example of a second image display region.

FIG. 14 is a diagram showing a display example of the second image display region 640. In FIG. 14, only the second image display region 640 of the user interface screen 600 is representatively shown. In addition, in FIG. 14, the user considers, as an example, a case in which the mapping image 540 of the specific position $b_k$ corresponding to the specific site $B_k$ that is specified to have a scratch is registered as the model image 810.

In the portion (a) of FIG. 14, the mapping image 540 of the specific position $b_k$ is displayed on the second image display region 640. When the model image 810 classified to the category of scratch is selected in the display image selection region 670 and the model display tab 654 is selected in a state displayed by the portion (a) of FIG. 14, a display of the second image display region 640 is switched to a display shown in the portion (b) of FIG. 14. Specifically, the registered model image 810 showing the scratch is displayed on the second image display region 640.

In addition, when the obtainment value display tab 652 is selected in a state shown in the portion (b) of FIG. 14, the display of the second image display region 640 is switched to the display shown in the portion (a) of FIG. 14.

Accordingly, an actually measured mapping image 540 and the model image 810 already registered can be compared on the same second image display region 640. Therefore, it can be actually visually confirmed whether the actually measured mapping image 540 is similar to the registered model image 810.

Figure 15:
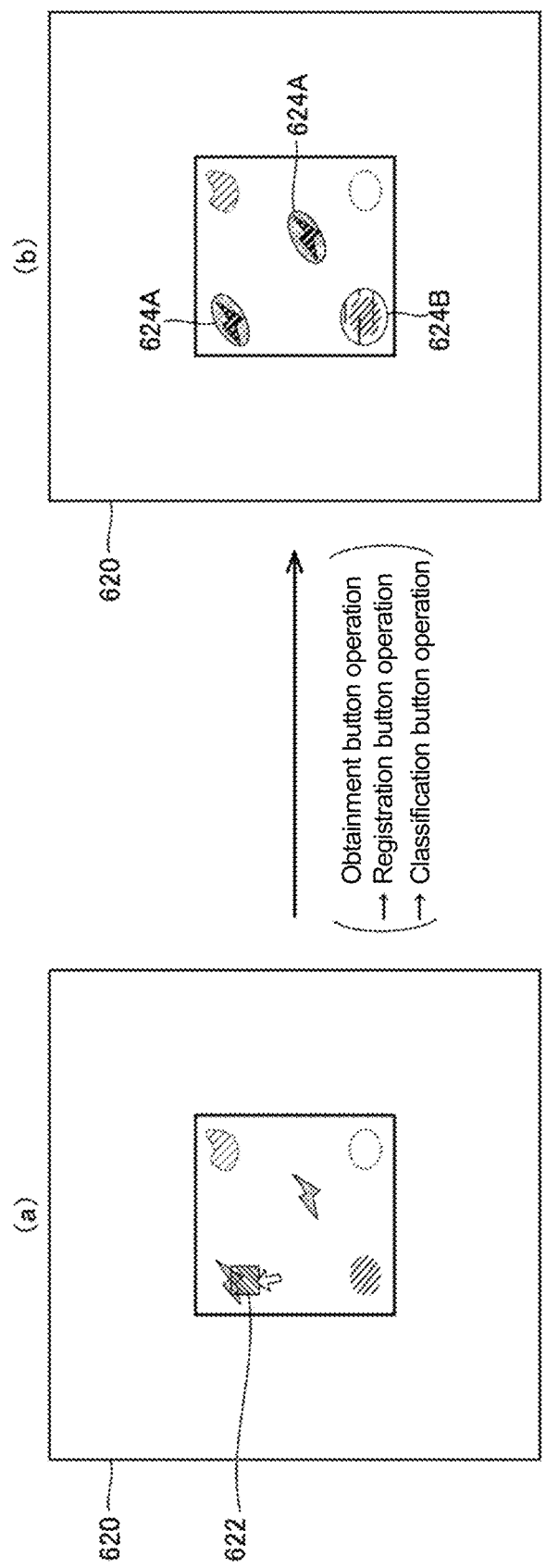
FIG. 15 is a diagram showing one example of transition of a display form of a first image display region.

FIG. 15 is a diagram showing one example of a transition of a display form of the first image display region 620. For example, as shown in the portion (a) of FIG. 15, when the user presses the obtainment button 682 in a state that a location where there is a defect is selected from an appearance image of the object W displayed on the first image display region 620, the mapping image 540 of a part on which the defect is arranged is displayed on the second image display region 640. The user specifies the type of the defect arranged in the selected location from the appearance image displayed on the first image display region 620, operates the category tab 664 of the registration destination selection region 660, and registers the mapping image 540 of the selected location as the model image 810 of the specified type of the defect.

For example, in the example shown in the portion (a) of FIG. 15, a position on which the scratch is arranged is selected, and the mapping image 540 of the position is registered as the model image 810 of the scratch. When the classification button 684 is operated after the registration button 686 is operated to register the model image 810, the image measurement is performed based on the registered model image 810. At this time, if the classification result display tab 632 is kept selected, as shown in the portion (b) of FIG. 15, display forms of the region classified to the category shown by the registered model image 810 are displayed by a different form. In addition, at this time, when the model image 810 of a plurality of categories is registered, the region is displayed by different display forms for each type of the categories.

In the example shown in the portion (b) of FIG. 15, the model images corresponding to the scratch and dirt are respectively registered. In this state, when the classification button 684 is operated, a mask image 624A is superimposed and displayed on the position judged to have a scratch, and a mask image 624B is superimposed and displayed on the position judged to have dirt. The user can easily recognize whether the classification is performed correctly by confirming the appearance image of the position where the mask image 624A and the mask image 624B displayed on the first image display region 620 are displayed. When the classification is not performed correctly, the mapping image 540 of the position in which the classification is not performed correctly may be newly registered in the model image 810. Accordingly, the precision of the classification can be improved.

J. One Example of Display Method of Image Measurement Result

Figure 16:
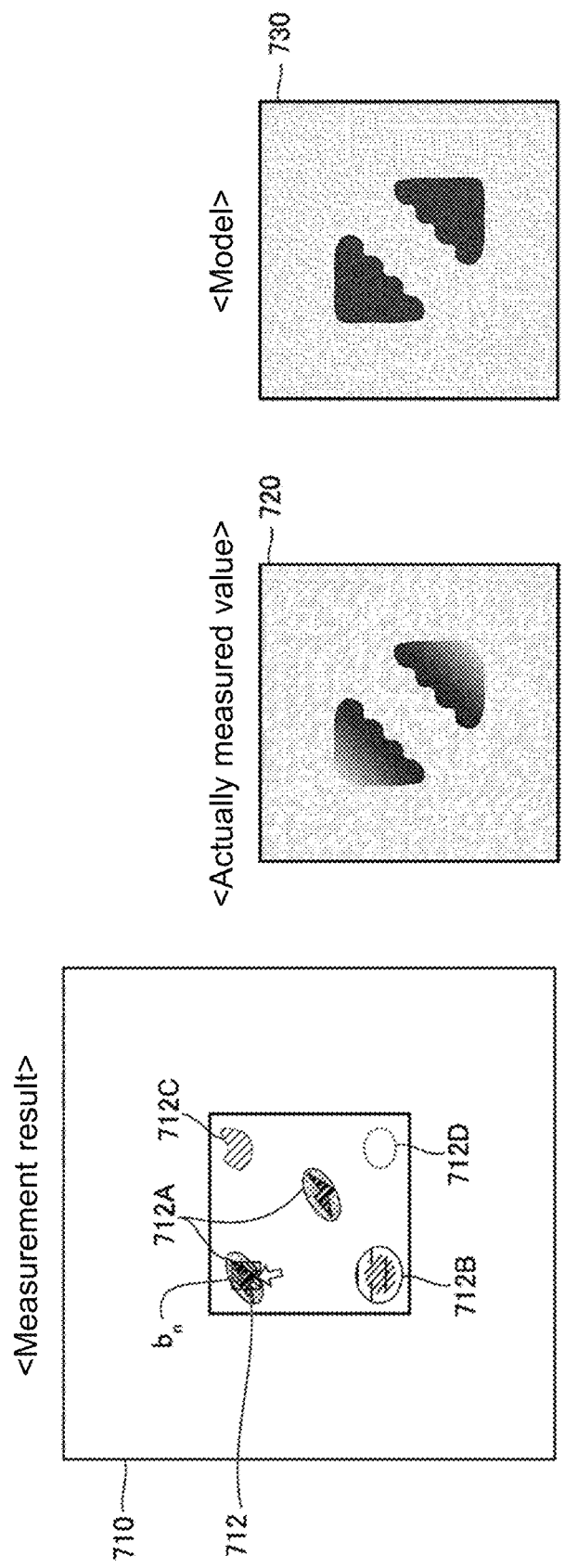
FIG. 16 is a diagram showing one example of a display method of a measurement result.

FIG. 16 is a diagram showing one example of a display method of the measurement result. The control device 100 generates the mapping images 540 for all the positions in the imaging visual field 81, and judges whether the sites (surfaces) on the object W corresponding to the respective positions are classified to the attributes (categories) corresponding to the model image 810 based on the similarity S with the model image 810 which is registered based on the mapping images 540. All the positions in the imaging visual field 81 may be the respective pixel positions in the imaging visual field 81 or a region configured by a plurality of pixels. In addition, at least the region in which the object W is positioned may be used as the measurement object when not all the regions in the imaging visual field 81 are used as the measurement object. In addition, it may be configured so that a range to be measured is indicated by the user.

For example, the display of the image measurement result includes an imaging region 710 for displaying a first image showing the imaging visual field, a result display region 720 for displaying the actually generated mapping image 540, and a reference information display region 730 for displaying the model image 810. These regions are displayed on the display portion 102 after the image measurement is performed.

The control device 100 can show the measurement positions b of a common attribute within a plurality of measurement positions b. For example, the control device 100 shows the measurement positions b of the common attribute in the same form. In the example shown in FIG. 16, the measurement positions b of the common attribute are shown by the mask image 712A to the mask image 712D on the imaging region 710. That is, in the imaging region 710, the measurement result is reflected to and displayed on the image obtained by the camera 8.

In addition, the control device 100 can simultaneously or sequentially output the reflection profile information 72 of the measurement positions b and the reflection profile reference information 80. Specifically, when the user selects the measurement position $b_n$ judged to have a specific attribute from the imaging visual field 81 displayed on the imaging region 710 via the input portion 104, the mapping image 540 of the measurement position $b_n$ is displayed on the result display region 720, and the model image 810 corresponding to the specific attribute is displayed on the reference information display region 730. Besides, the display of the reference information display region 730 may be selected from a plurality of model images 810. In addition, a selection of display content of the reference information display region 730 and a selection of display content of the result display region 720 may be set independently.

K. Functional Configuration

Figure 17:
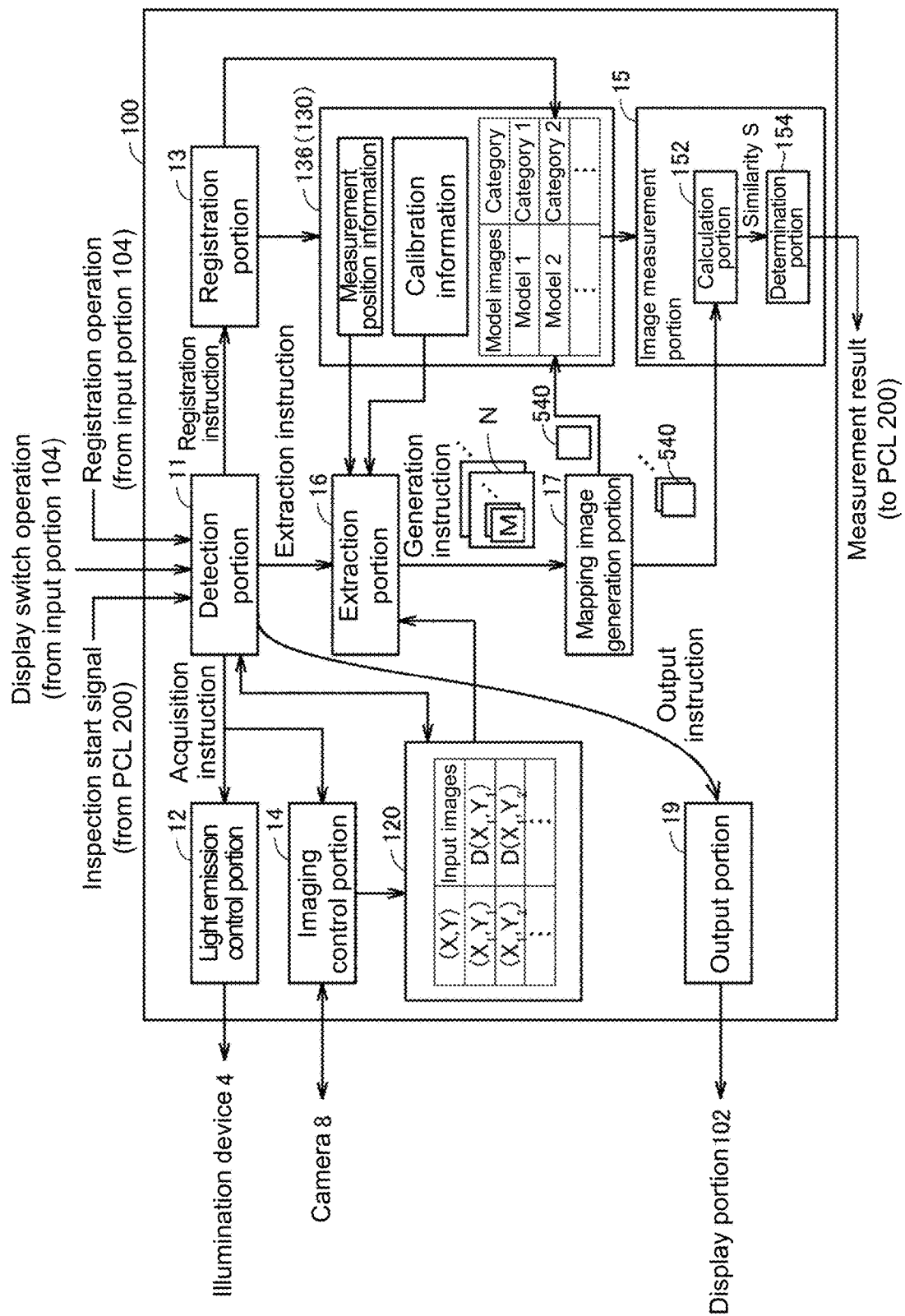
FIG. 17 is a schematic diagram showing a functional configuration of the control device.

FIG. 17 is a schematic diagram showing a functional configuration of the control device 100. The control device 100 controls each configuration shown in FIG. 17 and performs the image measurement by executing the image processing program 132.

The control device 100 includes, for example, a light emission control portion 12, an imaging control portion 14, a detection portion 11, an extraction portion 16, a mapping image generation portion 17, and an image measurement portion 15.

The detection portion 11 detects that a signal (inspection start signal) showing that the object W is conveyed to a prescribed inspection position is notified from a PLC 200. On detecting the inspection start signal, the detection portion 11 instructs the light emission control portion 12 and the imaging control portion (an obtainment instruction) in order to execute the process Ph1 for acquiring the input image D used for performing the image measurement. The light emission control portion 12 and the imaging control portion 14 function as an obtainment portion for executing the process Ph1.

The light emission control portion 12 controls, according to the obtainment instruction, the illumination device 4 to make the plurality of partial regions 43 which is set on the light emission surface 40 sequentially emit light.

The imaging control portion 14 controls the camera 8 to sequentially generate the images of the imaging visual field 81 corresponding to the sequential light emission of the partial regions 43. The imaging control portion 14 associates the input images D generated by the camera 8 with the positions (X, Y) on the light emission surface 40 of the partial regions 43 which emit light when the input images D are captured, and saves the association in the main memory 120 which is on kind of a storage portion.

The detection portion 11 issues an extraction instruction to the extraction portion 16 when the input images D are saved in the main memory 120. The extraction portion 16 extracts, based on the information of the measurement positions b contained in the inspection information 136, the partial image M corresponding to the measurement position b from each of the plurality of input images D saved in the main memory 120, and generates a partial image set N. When a plurality of measurement position b is set, the partial image set N is generated by the number of the measurement positions b that are set. In addition, the calibration information is contained in the inspection information 136, and the extraction portion 16 determines a range of the input image D used for each measurement position b. Specifically, the partial image M is extracted from the input images D generated in a state that the partial regions 43 set in a prescribed range taking the position (X, Y) on the light emission surface 40 corresponding to the measurement positions b as a reference emits light.

The extraction portion 16 instructs the mapping image generation portion 17 to generate the mapping image 540 which is the reflection profile information 72 (a generation instruction) when the partial image set N is generated for all the measurement positions b that are set. The mapping image generation portion 17 generates the mapping image 540 for each partial image set N. That is, the mapping image generation portion 17 functions as a conversion portion which converts the reflection profile information 72 to a representation form of the mapping image 540.

That is, the extraction portion 16 and the mapping image generation portion 17 function as a generation portion which generates the reflection profile information 74 from the plurality of input images D.

The image measurement portion 15 includes a calculation portion 152 and a determination portion 154. The calculation portion 152 calculates the similarity S with the model image 810 contained in the inspection information 136 for each mapping image 540 that is generated. The determination portion 154 determines whether the measurement site B corresponding to the mapping image 540 is classified to the attribute shown by the model image 810 based on the calculated similarity S. The determination portion 154 may display the obtained determination result on the display portion 102 or transmit the determination result as the image measurement result to the PLC 200.

The control device 100 may include a registration portion 13. The detection portion 11 issues a registration instruction to the registration portion 13 based on the fact that the input portion 104 has accepted the registration operation by the user. The registration portion 13 registers the mapping image 540 generated by the generation portion 18 as the model image 810 of the input category by the registration operation. Here, the mapping image 540 generated by the generation portion 18 refers to, for example, a mapping image 540 and the like generated by operating the obtainment button 682 of FIG. 13. For example, the control device 100 controls each configuration shown in FIG. 17 and performs a processing related to the registration by executing the setting program 134.

The control device 100 may include an output portion 19. The detection portion 11 issues an output instruction to the output portion 19 based on the fact that the input portion 104 has accepted the display switching operation by the user. The output portion 19 switches the display of the display portion 102 based on the content of the display switching operation. For example, the model image 810 or the mapping image 540 of the measurement position b is displayed. That is, the output portion 19 controls the display during the model registration shown in FIG. 13-FIG. 15 or the display during the image measurement shown in FIG. 16.

L. Flowchart

Figure 18:
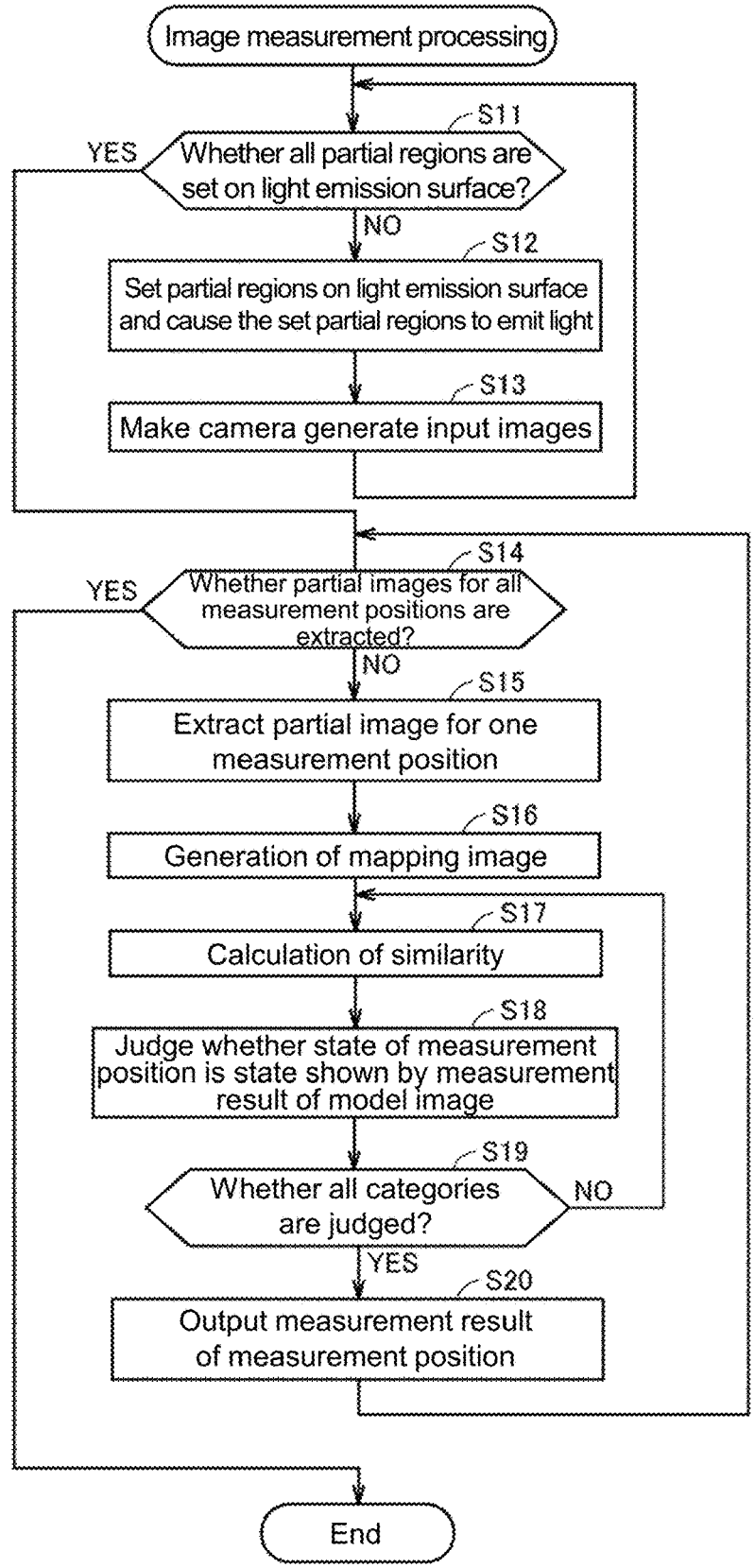
FIG. 18 is a flowchart of an image measurement processing.

FIG. 18 is a flowchart of an image measurement processing. The image measurement processing is a processing implemented by a CPU 110 executing the image processing program 132. The image measurement processing is executed each time the signal (inspection start signal) showing that the object W is conveyed to a prescribed inspection position is notified from the PLC 200.

In step S11, the CPU 110 judges whether all the partial regions 43 are set on the light emission surface 40. All the partial regions 43 mean all of the plural types of partial regions 43 set in advance. For example, the CPU 110 judges whether each partial region 43 which is set in different positions on the light emission surface 40 is set in all the positions that are set. The plural types of partial regions 43 may be set so that when a plurality of types of partial regions 43 emit light, the range on the light emission surface 40 in the predefined range emits light. The predefined range is a range arbitrarily set according to a size of the object W, the imaging visual field 81 or the like. When it is judged that there are partial regions 43 which are not set on the light emission surface 40 ("NO" in step S11), the CPU 110 switches the processing to step S12.

In step S12, the partial regions 43 are set on the light emission surface 40 and the set partial regions 43 are made to emit light.

In step S13, the CPU 110 makes the camera 8 generate the input images D. The CPU 110 repeats step S12 and step S13 until it is judged to be "YES" in step S11. Accordingly, the CPU 110 can make each of the plural types of partial regions 43 emit light, and can generate the input images D in synchronization with the light emission of each of the plural types of partial regions 43.

When a determination is made that the partial regions 43 are set in all the positions on the light emission surface 40 ("YES" in step S11), the CPU 110 switches the processing to step S14.

In step S14, the CPU 110 determines whether the partial images M related to all the measurement positions b are extracted. When a determination is made that the partial images M related to all the measurement positions b are extracted ("YES" in step S14), the CPU 110 ends the processing. When a determination is made that there are measurement positions b to which the partial images M are not extracted ("NO" in step S14), the CPU 110 switches the processing to step S15.

In step S15, the CPU 110 extracts the partial image M for one measurement position b. Specifically, the CPU 110 extracts the partial image M from the input image D generated when the partial region 43 is caused to emit light and the partial region 43 is set in the position included in a predetermined range taking the position (X, Y) on the light emission surface corresponding to the position of the measurement position b as a reference position.

In step S16, the CPU 110 generates the mapping image 540. Specifically, the CPU 110 generates the mapping image 540 by mapping the feature amount p shown by the partial image M in association with the position of the partial region 43 made to emit light when the input image D of an extraction source of each partial image M is generated.

That is, the CPU 110 generates the mapping image 540 which is the reflection profile information 74 from the plurality of input images D by performing step S15 and step S16.

In step S17, the CPU 110 calculates a similarity between the model image 810 and the mapping image 540.

In step S18, the CPU 110 judges, based on the similarity, whether the state of the measurement position b is a state shown by the measurement result that is shown by the model image 810. For example, the CPU 110 judges using a predetermined threshold as a reference.

In step S19, the CPU 110 determines whether a judgment is performed for all the categories. When a determination is made that there are categories that are not judged ("NO" in step S19), the CPU 110 repeats step S17 and step S18 until a determination is made that the judgment is performed for all the categories ("YES" in step S19).

When a determination is made that the judgment is performed for all the categories ("YES" in step S19), the CPU 110 switches to step S20.

In step S20, the CPU 110 outputs the measurement result of the measurement position b. The CPU 110 repeats step S15 to step S18 until a determination is made that the partial images M for all the measurement positions b are extracted ("YES" step S14). That is, by repeating step S15 to step S18, the CPU 110 performs the image measurement based on the reflection profile information 74.

M. First Variation Example of Inspection Method

In this embodiment, the model image 810 in which the reflection profile information 72 is converted to the mapping image 540 is shown as one example of the reflection profile reference information 80. That is, in the embodiment, one example is given out in which the reflection profile reference information 80 is represented in a representation form capable of being directly compared with the reflection profile information 72, but the reflection profile reference information 80 is not limited to the information represented in the representation form capable of being directly compared with the reflection profile information 72.

For example, the reflection profile information 72 may be obtained for each of the plurality of specific sites $B_k$ showing the common attribute, and a statistic value of the plurality of reflection profile information that is obtained is set as the reflection profile reference information 80. The statistic value may be, for example, a feature which is common in the plurality of reflection profile information obtained for each of the plurality of specific sites $B_k$ showing the common attribute. The control device 100 may perform the image measurement based on whether the reflection profile information 72 of the measurement position b includes the extracted feature.

Figure 19:
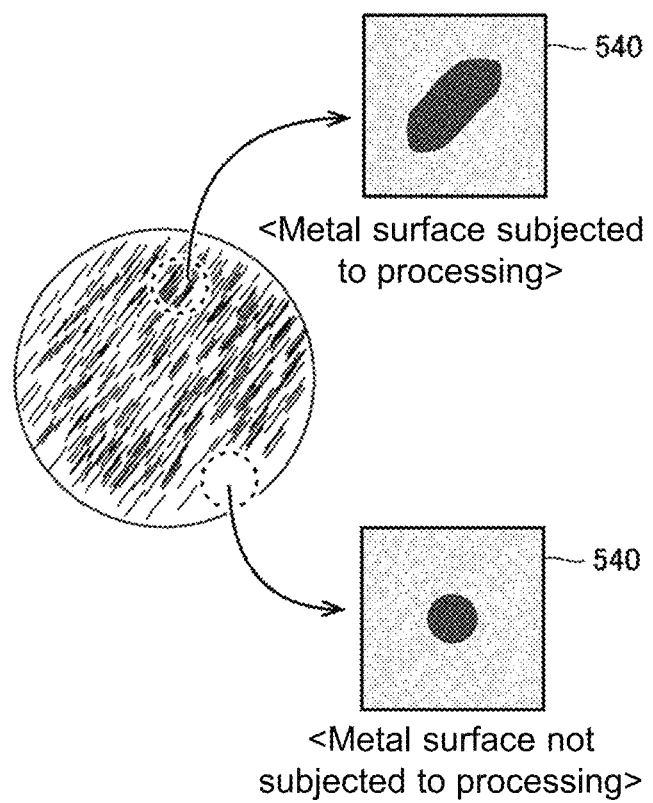
FIG. 19 is a diagram for describing a first variation example of an inspection method.
Figure 20:
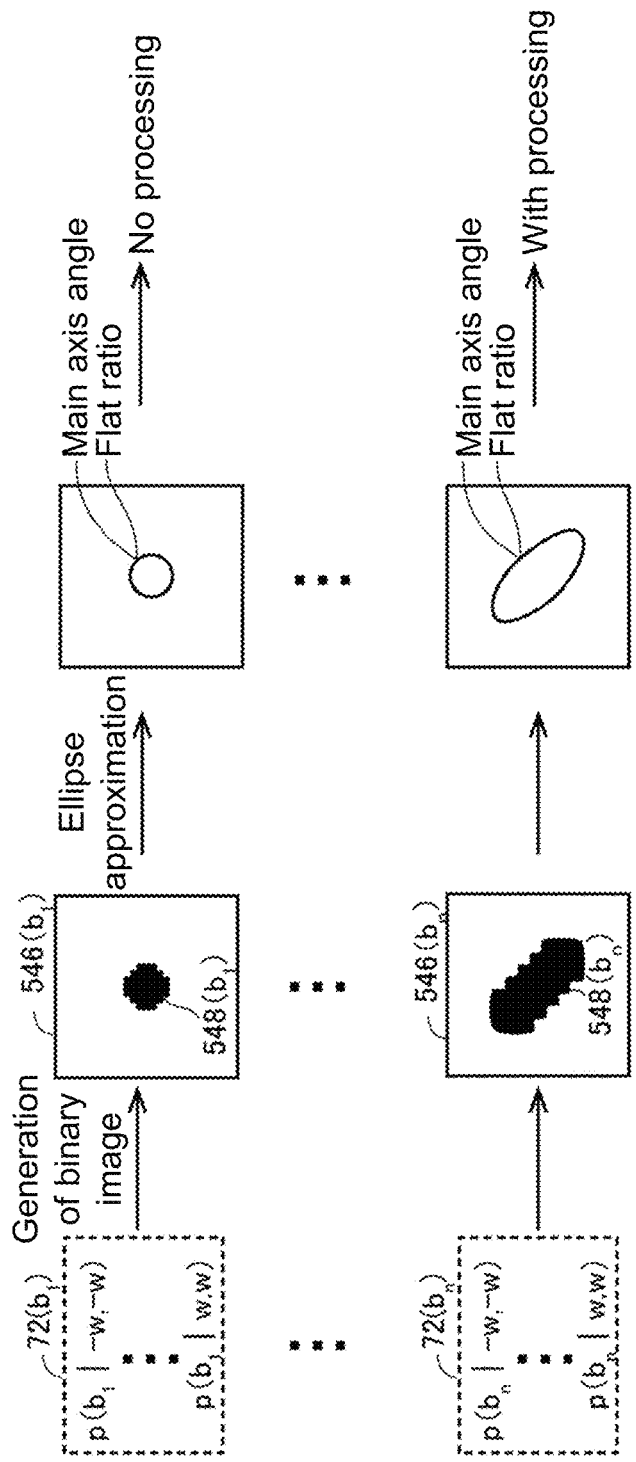
FIG. 20 is a diagram for describing the first variation example of the inspection method.

FIG. 19 and FIG. 20 are diagrams for describing a first variation example of the inspection method. For example, in the examples shown in FIG. 19 and FIG. 20, when a metal surface is uniformly subjected to a processing and the location which is not subjected to the processing exceeds a prescribed range, it is judged that there is a defect.

For example, for a site subjected to a hairline processing, reflection directions of light is scattered in a specific range and thus an image deviated with respect to the reference position shown in FIG. 19 appears on the mapping image 540. In contrast, for a flat site not subjected to the processing, the light is reflected in one direction and thus an image not deviated and having a peak near the reference position appears on the mapping image. That is, a feature of the reflection profile information 72 corresponding to an attribute that the hairline processing is applied is that an image deviated with respect to the reference position appears on the mapping image 540.

For example, in the example shown in FIG. 20, the control device 100 acquires the reflection profile information 72 ($b_1$) to the reflection profile information 72 ($b_n$) in the measurement positions $b_1$ to $b_n$ in the imaging visual field 81. The control device 100 determines whether each of the reflection profile information 72 ($b_1$) to the reflection profile information 72 ($b_n$) has the above feature, extracts the measurement position b without the feature and obtains an area thereof. When the obtained area exceeds the predetermined threshold, the control device 100 judges that the product is defective, that is, the processing is not uniformly applied.

Whether the feature is included, that is, whether the hairline processing is applied is judged by the following method. The control device 100 generates a binary image 546($b_1$) to a binary image 546($b_n$) which is one example of the mapping image 540 from the reflection profile information 72($b_1$) to the reflection profile information 72($b_n$). The control device 100 calculates a main axis angle and a flat ratio of the image 548 shown on the binary image 546 by performing an ellipse approximation to the image 548. Specifically, the control device 100 performs the ellipse approximation to each of the image 548 ($b_1$) to the image 548($b_n$) shown on each of the binary image 546($b_1$) to the binary image 546($b_n$), and calculates a main axis angle and a flat ratio of the ellipse. When the calculated flat ratio exceeds a threshold, the control device 100 judges that the feature is included, that is, the processing is applied. Besides, by using the main axis angle, a direction of the hairline processing can also be inspected.

Accordingly, in the first variation example, a feature of the reflection profile information of the specific site $B_k$ having a specific attribute is defined, and the feature is set as the reflection profile reference information 80. Then, a determination is made on whether the specific site $B_k$ is a site having the specific attribute based on whether the feature defined by the reflection profile reference information 80 is included. That is, in the embodiment, the example is shown in which the reflection profile reference information 80 is saved in a representation form capable of being directly compared with the reflection profile information 72, but the reflection profile reference information 80 is not limited to the representation form capable of being directly compared with the reflection profile information 72.

N. Second Variation Example of Inspection Method

Both in this embodiment and the first variation example, the example is shown in which the image measurement is performed based on the reflection profile reference information 80 which is the reflection profile information of the specific site $B_k$ having a known attribute. That is, the example is shown in which the image measurement is performed using the reflection profile reference information 80. Besides, the reflection profile reference information 80 may not be used.

The inspection method in the second variation example is a method which does not use the reflection profile reference information 80. For example, the control device 100 may compare the reflection profile information 72 which is obtained from the respective measurement positions b in the imaging visual field 81 with each other, extract the reflection profile information 72 different from other reflection profile information 72, and calculate the area of the measurement position b showing the extracted reflection profile information 72, thereby performing the image measurement. By such an inspection method, for example, an inspection on whether the surface shape of the object is uniform can be performed.

Figure 21:
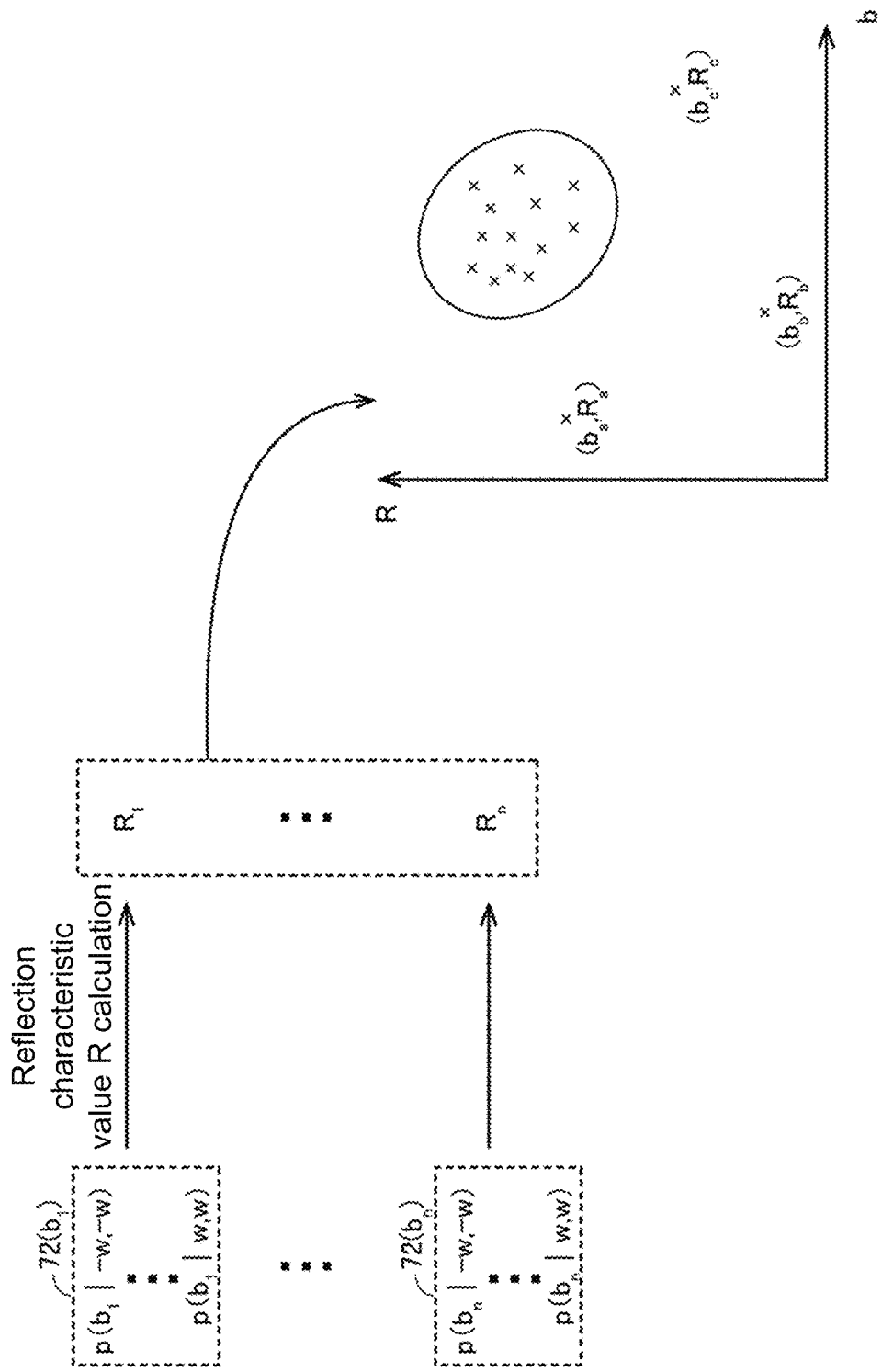
FIG. 21 is a diagram for describing a second variation example of the inspection method.

FIG. 21 is a diagram for describing the second variation example of the inspection method. The control device 100 acquires the reflection profile information 72 for all the measurement positions b in the imaging visual field 81. In the example shown in FIG. 21, the measurement position $b_1$ to the measurement position $b_n$ are set. The control device 100 acquires the reflection profile information 72($b_1$) to the reflection profile information 72($b_n$) by generating the reflection profile information 72 for each of the measurement position $b_1$ to the measurement position $b_n$.

The control device 100 calculates the reflection characteristic value R in which the reflection profile information is normalized and obtains the reflection characteristic value $R_1$ to the reflection characteristic value $R_n$, so that each of the reflection profile information 72($b_1$) to the reflection profile information 72($b_n$) can be directly compared. The reflection characteristic values R are, for example, values that are close if the shape of the image that appears on the mapping image 540 shown in FIG. 21 is similar, and that are far away if the shape is not similar.

The control device 100 extracts outliers from the reflection characteristic value $R_1$ to the reflection characteristic value $R_n$. In the example shown in FIG. 21, for example, the reflection characteristic values $R_a$, $R_b$, $R_c$ are extracted as the values (outliers) deviated from the other reflection characteristic values. The control device 100 counts the number of measurement positions $b_a$, $b_b$, $b_c$ corresponding to the reflection characteristic values $R_a$, $R_b$, $R_c$. Here, the calculation of a count value obtained by counting the number of the measurement positions $b_a$, $b_b$, $b_c$ is equivalent to obtaining an "area" on the image for the sites showing the abnormal reflection characteristics.

O. Variation Example of Position Relationship of Illumination Device, Camera, and Object In the embodiment, the example in which the illumination device 4 is disposed between the camera 8 and the object W is shown. Besides, the position relationship among the illumination device 4, the camera 8 and the object W is not limited to be coaxial, and may be a position relationship in which the light from the illumination device 4 are irradiated to the object W and at least one portion of the object W is included in the imaging visual field 81 of the camera 8.

Figure 22:
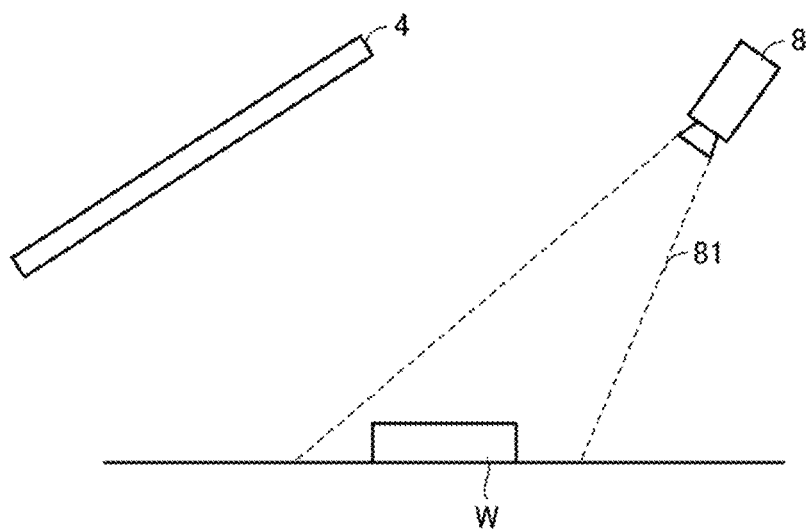
FIG. 22 is a diagram showing a variation example of a position relationship of the illumination device, a camera and an object.

FIG. 22 is a diagram showing a variation example of the position relationship among the illumination device 4, the camera 8 and the object W. For example, the illumination device 4 may not be disposed on an optical axis of the camera 8. In the example shown in FIG. 22, the illumination device 4 is not disposed on the optical axis of the camera 8, so that an illumination device without permeability can be adopted as the illumination device 4.

P. Variation Example of Illumination Device

Figure 23:
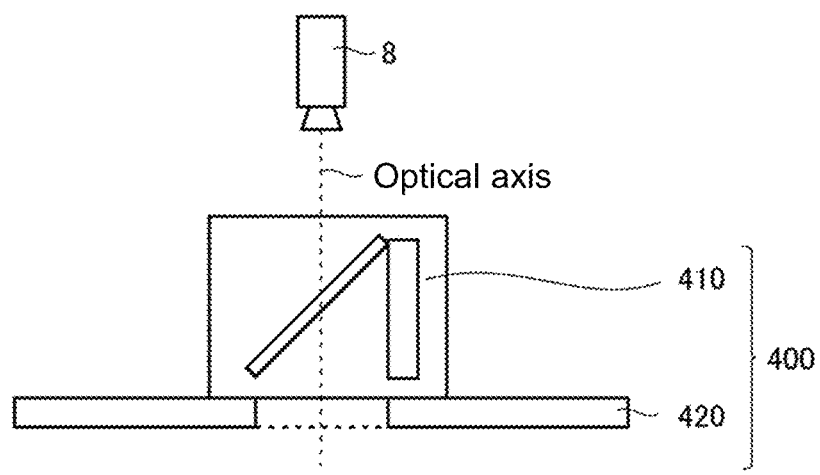
FIG. 23 is a diagram showing a variation example of the illumination device.

In the embodiment, a translucent organic EL lamp is mentioned as one example of the illumination device 4. Besides, when the illumination device 4 is disposed between the camera 8 and the object W, the illumination device 4 may have at least any one of a shape not blocking the visual field at least during the imaging and an optical characteristic not blocking the visual field. For example, the illumination device 4 may be the illumination device 4 in which an opening is arranged in one portion, the illumination device 4 in which one portion is configured by a coaxial incident illumination, or the like. FIG. 23 is a diagram showing a variation example of the illumination device. For the illumination device 400 of the variation example, one portion is configured by a coaxial incident illumination 410 and the other portion is configured by an illumination 420 without translucency.

Q. Variation Example of Setting Method of Partial Regions 43

In the embodiment, each partial region 43 is set not to be overlapped with another partial region 43. Besides, each partial region 43 can also be set to be overlapped with another partial region 43 in one portion. For example, by setting each partial region 43 to be overlapped with another partial region 43, a light amount at the time of making one partial region 43 emit light can be ensured without reducing a resolution of the reflection profile information.

In addition, when the light emission intensity of each illumination element 41 can be adjusted and each partial region 43 is set to be overlapped with another partial region 43, the illumination device 4 can also make the partial regions 43 emit light in a manner that the light emission intensities of the illumination elements 41 increase from boundaries of the partial regions 43 towards centres. On this occasion, the shading pattern of the partial regions is in the form of Gaussian distribution. In this way, compared with an occasion when the partial regions 43 evenly emit light, the light amount at the time of making one partial region 43 emit light can be further increased without reducing the resolution of the reflection profile information.

R. Generation Method of Reflection Profile Information When Attention Sites A Shows Prescribed Ranges In the embodiment, the attention sites A which are the measurement sites B or the specific sites $B_k$ show the prescribed positions, and the attention positions a corresponding to the attention sites A are information showing one point. Besides, the attention sites A may also be information showing prescribed ranges, and on this occasion, the attention positions a may also be ranges a' showing certain ranges within the images corresponding to the prescribed ranges. On this occasion, the reflection profile information of the attention sites A may be generated, for example, based on the reflection profile information obtained for each of the plurality of attention positions a included in the range a. For example, the reflection profile information of the attention sites A may be the information in which the reflection profile information obtained for each of the plurality of attention positions a is standardized, or be the information which is expressed by a representation form in which a plurality of mapping images obtained when each reflection profile information is mapped to the ij coordinate are synthesized. In addition, the reflection profile information of the attention sites A can also be obtained by setting the ranges of the partial images M to the ranges corresponding to the ranges a.

S. Other Variation Examples

In this embodiment, the reflection profile information 72 is represented by the coordinate ij which uses the position on the light emission surface 40 having a correspondence relationship with the measurement position b as a reference position. However, corresponding relation may also be represented by the coordinate XY on the light emission surface 40.

In the embodiment, while the image measurement is performed, the reflection profile information 72 is converted to the mapping image 540, and the image measurement is performed based on the mapping image 540. It may also be configured that with respect to learning data which is multiple reflection profile information 72 collected from the object having a known attribute, parameters (for example, an average, a variance, a covariance and the like) representing a distribution thereof are calculated to form the reflection profile reference information 80, and a discriminator or neural net designed from the reflection profile reference information 80 is used to obtain the similarity S for the reflection profile information 72 obtained at the time of measurement. Here, a mahalanobis distance, a subspace method, a support vector machine and the like may be used as the discriminator.

T. Operation and Effect

As described above, the control device 100 performs the image measurement based on the reflection profile information 72 which is the information showing the reflection characteristics of the measurement site B. The reflection profile information 72 is generated based on the input images D imaged and obtained by the camera 8 in a state that each of the plural types of partial regions 43 emits light. In other words, the degrees of the light reflected on the object and pass through a path to enter the imaging portion with respect to the light irradiated from the light emission surface are obtained independently for each position of the irradiated light emission surface, and the image measurement of the object is performed based on this information, and thus the image measurement based on a large amount of information can be performed. As a result, the performance of the image measurement can be improved. Furthermore, in the image measurement, it is unnecessary to set the illumination condition corresponding to the type of the object, and efforts required for a decision of the imaging condition can be reduced.

In addition, the control device 100 calculates the similarity S between the reflection profile reference information 80 and the reflection profile information 72. The attribute of the measurement site B is determined based on the calculated similarity S. In the image measurement, even the attribute of the measurement site B can be determined.

In addition, the reflection profile reference information 80 is the reflection profile information of the specific site $B_k$ of the reference object $W_k$ having a known attribute. Therefore, the reflection profile reference information 80 can be set by merely preparing a reference object $W_k$ corresponding to the content to be measured and obtaining the reflection profile information 72 of the specific site $B_k$ of the reference object $W_k$.

In addition, the reflection profile reference information 80 may be information statistically representing a plurality of reflection profile information 72. In other words, the reflection profile reference information 80 is not one information but the information based on a plurality of information, and thus the measurement precision can be increased.

In addition, when the user selects the measurement position $b_n$ which is judged to have a specific attribute from the imaging visual field 81 displayed on the imaging region 710 via the input portion 104, the mapping image 540 of the measurement position $b_n$ is displayed on the result display region 720, and the model image 810 corresponding to the specific attribute is displayed on the reference information display region 730. Both the mapping image 540 and the model image 810 are images mapped in the coordinate ij. Therefore, the user can represent the reflection profile information and the reflection profile reference information in the same coordinate system, and can display both information at the same time, and thus description property to the measurement result is secured.

In addition, the model image includes the first model image 811 and the second model image 812, and by comparing the first mapping image 541 to the fourth mapping image 544 of the respective measurement position $b_1$ to the measurement position b4 with the first model image 811 and the second model image 812, the attributes of the measurement site $B_1$ to the measurement site $B_4$ corresponding to the measurement position $b_1$ to the measurement position b4 can be classified. Therefore, the attribute of each measurement site B can be classified as to be which attribute of the plurality of attributes.

For example, in such a case that a defect inspection is performed, not only the presence or absence of a defect, but also a type of the defect and a position of the defect can be specified by the image measurement.

In the inspection method in the second variation example, the reflection profile information 72 which is obtained from each measurement position b in the imaging visual field 81 is compared with each other without using the reflection profile reference information 80, thereby judging the attribute of each measurement position b. Since the reflection profile reference information 80 may not be prepared, operation of data input, registration and the like that that are required to performed by a designer as a preparation for starting the inspection can be simplified.

U. Appendix

As described above, the embodiment includes disclosures as below.
(Configuration 1)
An image processing system (1) for performing an image measurement, the image processing system (1) including:
  an imaging portion (8), which images an object (W);
  a light emission portion (4), which includes a light emission surface (40) directed toward the object (W);
  a light emission control portion (12), which controls the light emission portion (4) in a manner that each of plural types of partial regions (43) set in advance within the light emission surface (40) emits light;
  an imaging control portion (14), which controls the imaging portion (8) to image in synchronization with light emission of each of the plural types of partial regions (43);
  a generation portion (18, 16, 17), which generates reflection profile information (70, 72), wherein the reflection profile information (70, 72) is obtained based on a plurality of images (D) which are captured by the imaging portion (8) in synchronization with the light emission of each of the plural types of partial regions (43), and the reflection profile information (70, 72) shows relationships between positions (X, Y, i, j) within the light emission surface (40) and degrees of light ($L_c$) reflected to attention sites (A, B, $B_k$) of the object (W) and incident to the imaging portion (8) with respect to light (Li) irradiated from the positions to the object (W); and
  an image measurement portion (15), which performs the image measurement of the object (W) based on the reflection profile information (70, 72) generated by the generation portion (18, 16, 17).
(Configuration 2)
The image processing system according to configuration 1, wherein the image measurement portion (15) further includes:
  a calculation portion (152), which calculates a similarity (S) between the reflection profile information (72, 540) generated from images (D) obtained by imaging the object (W) and reflection profile reference information (80, 810) set in advance; and
  a determination portion (154), which uses the similarity (S) calculated by the calculation portion (152) to judge an attribute of the object (W) or the attention sites (B).
(Configuration 3)
The image processing system according to configuration 2, wherein the reflection profile reference information (80, 810) is the reflection profile information (72, 540) generated from the images (D) obtained by imaging an object ($W_k$) having a known attribute or a specific site ($B_k$) of the object ($W_k$).
(Configuration 4)
The image processing system according to configuration 3, wherein the reflection profile reference information (80) is information which statistically represents a plurality of reflection profile information generated for each of a plurality of sites which have mutually equal attributes.

(Configuration 5)

The image processing system according to configuration 3 or configuration 4, wherein the reflection profile information (72) is information which is obtained from each of the plurality of images (D) and which is based on luminance information (p) corresponding to attention points (a) in an imaging visual field within the images (D) and relative positions (i, j) with respect to the attention points (a) of the partial regions (43), in which light is emitted when the images are captured;

an output portion (19) is further included which outputs the reflection profile information (72) by a representation form in which information (56) corresponding to the luminance information is output to a coordinate system with two or more axes corresponding to the relative positions (i, j); and the output portion (19) sequentially or simultaneously outputs the reflection profile reference information (810) and the reflection profile information (540) of the object to the coordinate system (720, 730).

(Configuration 6)

The image processing system according to any one of configurations 2 to 5, wherein the reflection profile reference information (810) includes one or a plurality of first reflection profile reference information (811) corresponding to a first attribute and one or a plurality of second reflection profile reference information (812) corresponding to a second attribute; and the determination portion (154) classifies, based on the reflection profile information (72, 540) generated for each of the plurality of attention sites ($B_1$-$B_n$) on the object (W), the attributes of the plurality of attention sites for each attention site.

(Configuration 7)

The image processing system according to configuration 1, wherein the image measurement portion (15) judges the attribute of each of the plurality of attention sites by extracting a feature amount (R) of the reflection profile information (72) generated for each of a plurality of attention sites on the object and evaluating the feature amount corresponding to each attention site.

(Configuration 8)

An image processing program (132) executed in an image processing device (100) that controls an imaging portion (8) imaging an object (W) and a light emission portion (4) having a light emission surface (40) directed toward the object (W) to perform an image measurement, the image processing program (132) including:

a step (S11, S12) in which the light emission portion (4) is controlled in a manner that each of plural types of partial regions (43) set in advance within the light emission surface (40) emits light;

a step (S13) in which the imaging portion (8) is controlled to image in synchronization with the light emission of each of the plural types of partial regions (43);

a step (S15, S16) in which reflection profile information (70, 72) is generated, wherein reflection profile information (70, 72) is obtained based on a plurality of images (D) which are captured by the imaging portion (8) in synchronization with the light emission of each of the plural types of partial regions (43), and the reflection profile information (70, 72) shows relationships between positions (X, Y, i, j) within the light emission surface (40) and degrees of light (Lc) reflected at attention sites (A, B, $B_k$) of the object (W) and incident to the imaging portion (8) with respect to light (Li) irradiated from the position to the object (W); and a step (S17, S18) in which the image measurement of the object (W) is performed based on the reflection profile information (70, 72) that is generated.

(Configuration 9)

An image processing device (100) which controls an imaging portion (8) imaging an object (W) and a light emission portion (4) having a light emission surface (40) directed toward the object (W) to perform an image measurement, the image processing device (100) including:

a light emission control portion (12), which controls the light emission portion (4) in a manner that each of plural types of partial regions (43) set in advance within the light emission surface (40) emits light;

an imaging control portion (14), which controls the imaging portion (8) to image in synchronization with light emission of each of the plural types of partial regions (43);

a generation portion (18, 16, 17), which generates reflection profile information (70, 72), wherein the reflection profile information (70, 72) is obtained based on a plurality of images (D) which are captured by the imaging portion (8) in synchronization with the light emission of each of the plural types of partial regions (43), and the reflection profile information (70, 72) shows relationships between positions (X, Y, i, j) within the light emission surface (40) and degrees of light ($L_c$) reflected to attention sites (A, B, $B_k$) of the object (W) and incident to the imaging portion (8) with respect to light (Li) irradiated from the positions to the object (W); and an image measurement portion (15), which performs the image measurement of the object (W) based on the reflection profile information (70, 72) generated by the generation portion (18, 16, 17).

(Configuration 10)

An image processing system (1) which uses an appearance image of an object (W) to perform an image measurement, including:

an imaging portion (8), which images the object (W);

a light emission portion (4), which is disposed between the imaging portion (8) and the object (W), and has a light emission surface (40) directed toward the object (W);

a light emission control portion (12), which controls the light emission portion (4) to make unit partial regions (43) with predefined sizes sequentially be set in different positions (X, Y) on the light emission surface (40) to emit light;

an imaging control portion (14), which controls the imaging portion (8) to sequentially generate, corresponding to the sequential light emission of the unit partial region (43), input images (D) which are images of an imaging visual field (81);

an extraction portion (16), which respectively extracts, for each of one or a plurality of measurement positions (b) set in the imaging visual field (81), partial images (M) corresponding to the measurement positions (b) from at least a part of the input images (D) that are sequentially generated;

a generation portion (17), which generates, for each of the measurement positions (b), a mapping image (540) in which a feature amount (p) shown by each partial image (M) extracted by the extraction portion (16) is mapped in association with to a position (X, Y, i, j) of the unit partial region (43) that emits light when the input image (D) being an extraction source of each partial image (M) is generated; and an image measurement portion (15), which judges, by calculating a similarity (S) between a model image (810) which is the mapping image (540) generated from an image obtained by imaging a region ($b_k$) having a known measurement result and the mapping image (540) of each measurement position (b), whether each measurement position (b) of the object (W) is in a state equivalent to the known measurement result.

(Configuration 11)

The image processing system according to configuration 10, wherein the mapping image (540) of each measurement position is generated taking a position (X, Y) on the light emission surface that has a correspondence relationship with the measurement position (x, y) as a reference position.

(Configuration 12)

The image processing system according to configuration 11, wherein the generation portion (17) generates the mapping image (540) using the partial images (M) extracted from the input images (D) within the sequential generated input images (D) and generated at the time of making the unit partial regions (43) emit light, wherein the unit partial regions (43) are set in positions included in a predetermined range $(X_r-w \leq X \leq X_r+w, Y_r-w \leq Y \leq Y_r+w)$ centered on the reference position (X, Y).

(Configuration 13)

The image processing system according to any one of configuration 10 to configuration 12, wherein the model image (810) includes a first model image (811) corresponding to a first measurement result, and a second model image (812) corresponding to a second measurement result;

the image measurement portion (15) judges whether the measurement position $(b_1)$ is in a state equivalent to the first measurement result based on a first similarity $(S_{1|1})$ of the mapping image (540) with respect to the first model image (811), and judges whether the measurement position $(b_1)$ is in a state equivalent to the second measurement result based on a second similarity $(S_{1|2})$ of the mapping image (540) with respect to the second model image (812).

(Configuration 14)

The image processing system according to any one of configuration 10 to configuration 13, including a registration portion (13) which registers the mapping image (810) to a reference measurement position $(b_k)$ having a measurement result that is already known as the model image (810) of the measurement result.

(Configuration 15)

The image processing system according to configuration 14, further including an input portion (104) which receives an input by a user, and a display device (102) which displays images of an imaging visual field that are imaged by the imaging portion (8);

wherein the generation portion (18) generates the mapping image (540) based on a position indication (622) to the images of the imaging visual field received by the input portion (102) and displayed on the display device and based on the partial image (M) extracted from the indicated position; and the registration portion (13) registers (686) the mapping image (540, 640) based on the partial image (M) generated by the generation portion and extracted from the indicated position (622) as the model image (810) of the measurement result (664) received by the input portion.

It should be considered that the embodiment disclosed here is illustrative instead of limitative in all aspects. The scope of the disclosure is shown by the claims instead of the description above and meanings equivalent to the claims and all modifications within the scope are intended to be included in the scope of the disclosure. In addition, the disclosures described in the embodiments and each variation example are intended to be performed individually or in combination wherever possible.

What is claimed is:

1. An image processing system performing an image measurement, the image processing system comprising:
    an imaging circuit, which images an object;
    a light emission circuit, which has a light emission surface directed toward the object;
    a light emission control circuit, which controls the light emission circuit in a manner that each of plural types of partial regions set in advance in the light emission surface emits light;
    an imaging control circuit, which controls the imaging circuit to image in synchronization with light emission of each of the plural types of partial regions;
    a generation circuit, which generates reflection profile information, wherein the reflection profile information is obtained based on a plurality of images which are captured by the imaging circuit in synchronization with the light emission of each of the plural types of partial regions, and the reflection profile information shows relationships between positions within the light emission surface and degrees of light reflected at attention sites of the object and incident to the imaging circuit with respect to the light irradiated to the object from the positions; and
    an image measurement circuit, which performs the image measurement of the object based on the reflection profile information generated by the generation circuit,
    wherein the image measurement circuit further comprises:
    a calculation circuit, which calculates a similarity between the reflection profile information generated from images obtained by imaging the object and reflection profile reference information set in advance; and
    a determination circuit, which uses the similarity calculated by the calculation circuit to judge an attribute of the object or the attention sites.

2. The image processing system according to claim 1, wherein the reflection profile reference information is the reflection profile information generated from the images obtained by imaging an object having a known attribute or a specific site of the object.

3. The image processing system according to claim 2, wherein the reflection profile reference information is information which statistically represents a plurality of reflection profile information generated for each of a plurality of sites which have mutually equal attributes.

4. The image processing system according to claim 2, wherein the reflection profile information is information which is obtained from each of the plurality of images and which is based on luminance information corresponding to attention points in an imaging visual field within the images and relative positions with respect to the attention points of the partial regions which emit light when the images are captured;
    an output circuit is further included which outputs the reflection profile information by a representation form in which the information corresponding to the luminance information is output to a coordinate system of two or more axes corresponding to the relative positions; and
    the output circuit sequentially or simultaneously outputs the reflection profile reference information and the reflection profile information of the object to the coordinate system.

5. The image processing system according to claim 3, wherein the reflection profile information is information which is obtained from each of the plurality of images and which is based on luminance information corresponding to attention points in an imaging visual field within the images and relative positions with respect to the attention points of the partial regions which emit light when the images are captured;
    an output circuit is further included which outputs the reflection profile information by a representation form in which the information corresponding to the luminance information is output to a coordinate system of two or more axes corresponding to the relative positions; and
    the output circuit sequentially or simultaneously outputs the reflection profile reference information and the reflection profile information of the object to the coordinate system.

6. The image processing system according to claim 1, wherein the reflection profile reference information comprises one or a plurality of first reflection profile reference information corresponding to a first attribute and one or a plurality of second reflection profile reference information corresponding to a second attribute; and
    the determination circuit classifies, based on the reflection profile information generated for each of a plurality of attention sites on the object, the attributes of the plurality of attention sites for each attention site.

7. The image processing system according to claim 2, wherein the reflection profile reference information comprises one or a plurality of first reflection profile reference information corresponding to a first attribute and one or a plurality of second reflection profile reference information corresponding to a second attribute; and
    the determination circuit classifies, based on the reflection profile information generated for each of a plurality of attention sites on the object, the attributes of the plurality of attention sites for each attention site.

8. The image processing system according to claim 3, wherein the reflection profile reference information comprises one or a plurality of first reflection profile reference information corresponding to a first attribute and one or a plurality of second reflection profile reference information corresponding to a second attribute; and
    the determination circuit classifies, based on the reflection profile information generated for each of a plurality of attention sites on the object, the attributes of the plurality of attention sites for each attention site.

9. The image processing system according to claim 4, wherein the reflection profile reference information comprises one or a plurality of first reflection profile reference information corresponding to a first attribute and one or a plurality of second reflection profile reference information corresponding to a second attribute; and
    the determination circuit classifies, based on the reflection profile information generated for each of a plurality of attention sites on the object, the attributes of the plurality of attention sites for each attention site.

10. The image processing system according to claim 5, wherein the reflection profile reference information comprises one or a plurality of first reflection profile reference information corresponding to a first attribute and one or a plurality of second reflection profile reference information corresponding to a second attribute; and
    the determination circuit classifies, based on the reflection profile information generated for each of a plurality of attention sites on the object, the attributes of the plurality of attention sites for each attention site.

11. The image processing system according to claim 1, wherein the image measurement circuit judges the attribute of each of the plurality of attention sites by extracting a feature amount of the reflection profile information generated for each of the plurality of attention sites on the object and evaluating the feature amount corresponding to each attention site.

12. An image processing device, which controls an imaging circuit imaging an object and a light emission circuit having a light emission surface directed toward the object to perform an image measurement, the image processing device comprising:
    a light emission control circuit, which controls the light emission circuit in a manner that each of plural types of partial regions set in advance in the light emission surface emits light;
    an imaging control circuit, which controls the imaging circuit to image in synchronization with each of the light emission of the plural types of partial regions;
    a generation circuit, which generates reflection profile information, wherein the reflection profile information is obtained based on a plurality of images which are captured by the imaging circuit in synchronization with the light emission of each of the plural types of partial regions, and the reflection profile information shows relationships between positions within the light emission surface and degrees of light reflected at attention sites of the object and incident to the imaging circuit with respect to the light irradiated to the object from the positions; and
    an image measurement circuit, which performs the image measurement of the object based on the reflection profile information generated by the generation circuit,
    wherein the image measurement circuit further comprises:
    a calculation circuit, which calculates a similarity between the reflection profile information generated from images obtained by imaging the object and reflection profile reference information set in advance; and
    a determination circuit, which uses the similarity calculated by the calculation circuit to judge an attribute of the object or the attention sites.

13. A non-transitory computer readable medium having an image processing program stored thereon, the image processing program being executed in an image processing device which controls an imaging circuit imaging an object and a light emission circuit having a light emission surface directed toward the object to perform an image measurement, the image processing program comprising:
    controlling the light emission circuit in a manner that each of plural types of partial regions set in advance in the light emission surface emits light;
    controlling the imaging circuit to image in synchronization with light emission of each of the plural types of partial regions;
    generating reflection profile information, wherein the reflection profile information is obtained based on a plurality of images which are captured by the imaging circuit in synchronization with the light emission of each of the plural types of partial regions, and the reflection profile information shows relationships between positions within the light emission surface and degrees of light reflected at attention sites of the object and incident to the imaging circuit with respect to the light irradiated to the object from the positions;

performing the image measurement of the object based on the reflection profile information that is generated;

calculating a similarity between the reflection profile information generated from images obtained by imaging the object and reflection profile reference information set in advance; and using the similarity calculated to judge an attribute of the object or the attention sites.

* * * * *